US012689714B2

(12) United States Patent
Osada et al.

(10) Patent No.: US 12,689,714 B2
(45) Date of Patent: Jul. 21, 2026

(54) PROJECTION SYSTEM AND CONTROL METHOD FOR PROJECTION SYSTEM

(71) Applicant: Panasonic Intellectual Property Management Co., Ltd., Osaka (JP)

(72) Inventors: Masami Osada, Osaka (JP); Norimitsu Sugiyama, Osaka (JP); Takashi Watanabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 321 days.

(21) Appl. No.: 18/367,106

(22) Filed: Sep. 12, 2023

(65) Prior Publication Data

US 2023/0421735 A1 Dec. 28, 2023

Related U.S. Application Data

(63) Continuation of application No. PCT/JP2022/009905, filed on Mar. 8, 2022.

(30) Foreign Application Priority Data

Mar. 16, 2021 (JP) ................................. 2021-042851

(51) Int. Cl.
*H04N 9/31* (2006.01)
*G03B 21/14* (2006.01)
(52) U.S. Cl.
CPC ......... *H04N 9/3147* (2013.01); *H04N 9/3185* (2013.01)
(58) Field of Classification Search
CPC ..... H04N 9/3147; H04N 9/3185; G03B 21/14
See application file for complete search history.

(56) References Cited

U.S. PATENT DOCUMENTS

2002/0122075 A1 9/2002 Karasawa et al.
2006/0288293 A1 12/2006 Karasawa et al.
(Continued)

FOREIGN PATENT DOCUMENTS

JP 9-149296 6/1997
JP 3216644 10/2001
(Continued)

OTHER PUBLICATIONS

Extended European Search Report issued Jun. 7, 2024 in European Patent Application No. 22771178.5.
(Continued)

*Primary Examiner* — Ryan D Howard
(74) *Attorney, Agent, or Firm* — Wenderoth, Lind & Ponack L.L.P.

(57) ABSTRACT

A projection system is configured to project first and second projection images, with end portions of the first and second projection images overlapping. The projection system includes a first projector projecting the first projection image and a second projector projecting the second projection image. The first projector acquires first projection image data and a first control signal, the first projection image data representing the first projection image that is a clipping of an original projection image, the first control signal being linked to the first projection image data and being for controlling driving of the first projector. The second projector acquires second projection image data and a second control signal, the second projection image data representing the second projection image that is a clipping of the original projection image, the second control signal being linked to the second projection image data and being for controlling driving of the second projector.

13 Claims, 19 Drawing Sheets

(56)                References Cited

U.S. PATENT DOCUMENTS

| | | |
|---|---|---|
| 2006/0290809 A1 | 12/2006 | Karasawa et al. |
| 2013/0300765 A1 | 11/2013 | Karasawa et al. |
| 2013/0326568 A1 | 12/2013 | Tanaka et al. |
| 2015/0242438 A1 | 8/2015 | Karasawa et al. |
| 2015/0245073 A1 | 8/2015 | Karasawa et al. |
| 2017/0127032 A1 | 5/2017 | Takahashi et al. |

FOREIGN PATENT DOCUMENTS

| | | |
|---|---|---|
| JP | 2008-51848 | 3/2008 |
| JP | 2011-129140 | 6/2011 |
| JP | 2013-247591 | 12/2013 |
| JP | 2014-178503 | 9/2014 |
| JP | 2015-207294 | 11/2015 |
| JP | 2016-139954 | 8/2016 |
| JP | 2019-102867 | 6/2019 |

OTHER PUBLICATIONS

International Search Report issued May 31, 2022 in International (PCT) Application No. PCT/JP2022/009905.
Decision of Rejection issued Nov. 11, 2025 in corresponding Japanese Patent Application No. 2023-506988, with English machine translation.

Figure 9:
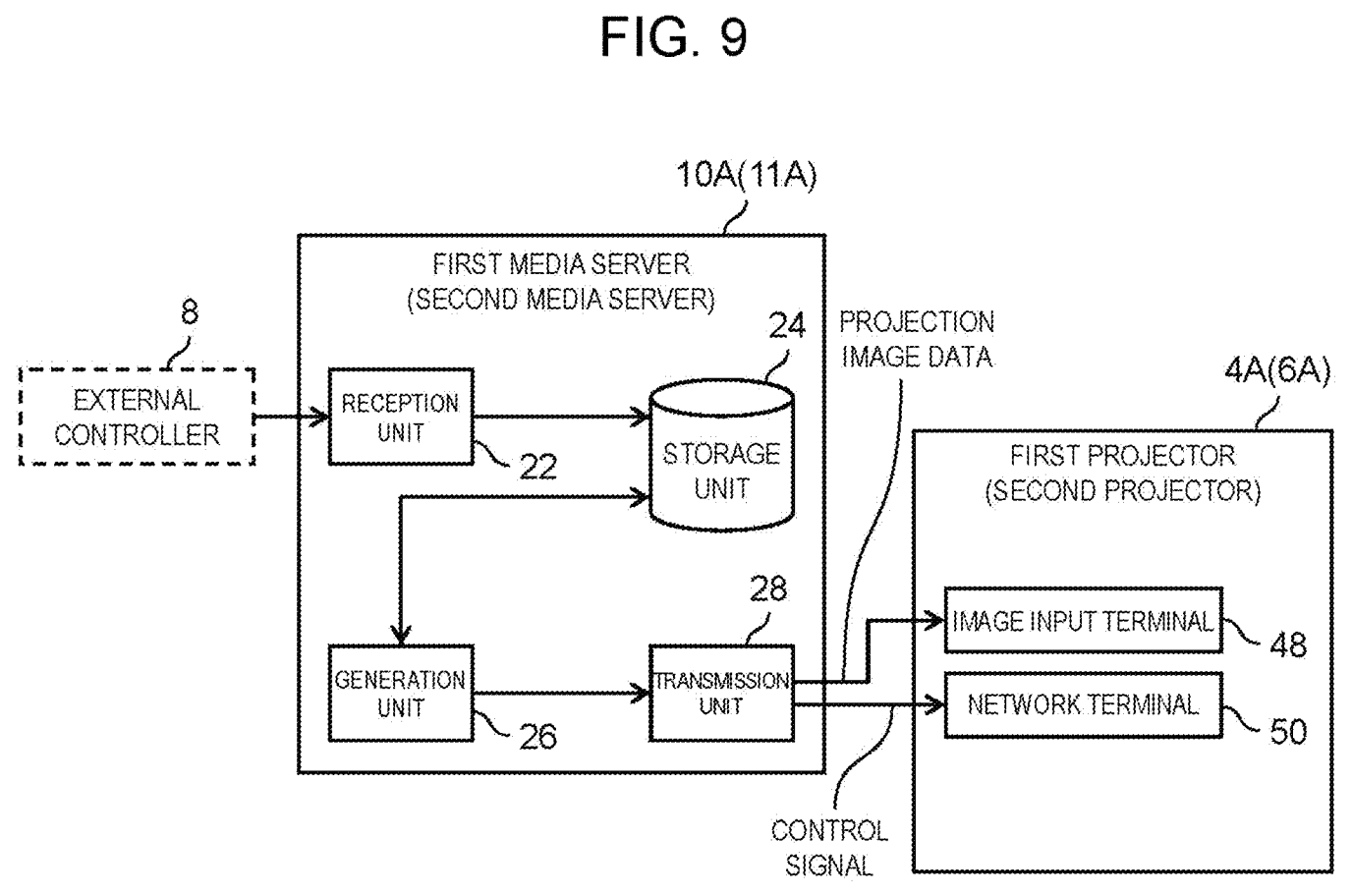

PROJECTION
IMAGE DATA

CONTROL
SIGNAL

4A(6A)

FIRST PROJECTOR
(SECOND PROJECTOR)

IMAGE INPUT TERMINAL    48

NETWORK TERMINAL    50

10A(11A)

FIRST MEDIA SERVER
(SECOND MEDIA SERVER)

STORAGE
UNIT    24

TRANSMISSION
UNIT    28

RECEPTION
UNIT    22

GENERATION
UNIT    26

8

EXTERNAL
CONTROLLER

FIG. 12

PROJECTION SYSTEM AND CONTROL METHOD FOR PROJECTION SYSTEM

BACKGROUND

1. Technical Field

The present disclosure relates to a projection system and a control method for the projection system.

2. Description of the Related Art

There has been what is called a multi-projection system including a plurality of projectors projecting a plurality of respective projection images onto a projection surface, in a manner connected to one another as one large overall projection image (see Unexamined Japanese Patent Publication No. 2019-102867, for example).

In the conventional multi-projection system, when the number of projectors to be used increases, there arises a problem that it takes time and effort in the adjustment of each one of the projectors.

SUMMARY OF THE INVENTION

The present disclosure provides a projection system and a control method for the projection system capable of controlling driving of individual projectors, easily.

A projection system according to the present disclosure is a projection system configured to project a first projection image and a second projection image onto a projection surface, with an end portion of the first projection image and an end portion of the second projection image overlapping each other, the projection system including: a first projector configured to project the first projection image onto the projection surface; and a second projector configured to project the second projection image onto the projection surface, in which the first projector is configured to acquire first projection image data and a first control signal, the first projection image data representing the first projection image that is a clipping of an original projection image, the first control signal being linked to the first projection image data to control driving of the first projector, and the second projector is configured to acquire second projection image data and a second control signal, the second projection image data representing the second projection image that is a clipping of the original projection image, the second control signal being linked to the second projection image data to control driving of the second projector.

With the projection system and the like according to the present disclosure, it is possible to control driving of individual projectors, easily.

BRIEF DESCRIPTION OF THE DRAWINGS

FIG. 3 is a block diagram illustrating a functional configuration of a media server according to the exemplary embodiment.

FIG. 9 is a block diagram illustrating a functional configuration of a first media server (second media server) according to the first modification.

FIG. 12 is a block diagram illustrating a functional configuration of a media server according to the second modification.

DETAILED DESCRIPTION

An exemplary embodiment will now be explained in detail with reference to the drawings as appropriate. Note that descriptions more in detail than necessary are sometimes omitted. For example, detailed descriptions of already well-known matters and redundant descriptions of approximately the same configurations are sometimes omitted. This is to avoid unnecessary redundancy in the description below, and to facilitate understanding of those skilled in the art.

Note that the inventors of the present disclosure provide the appended drawings and the following description with an intention to allow those skilled in the art to fully understand the present disclosure, and do not intend to limit the subject matter described in the appended claims in any way.

EXEMPLARY EMBODIMENT

1-1. Overview of Projection System

Figure 1:
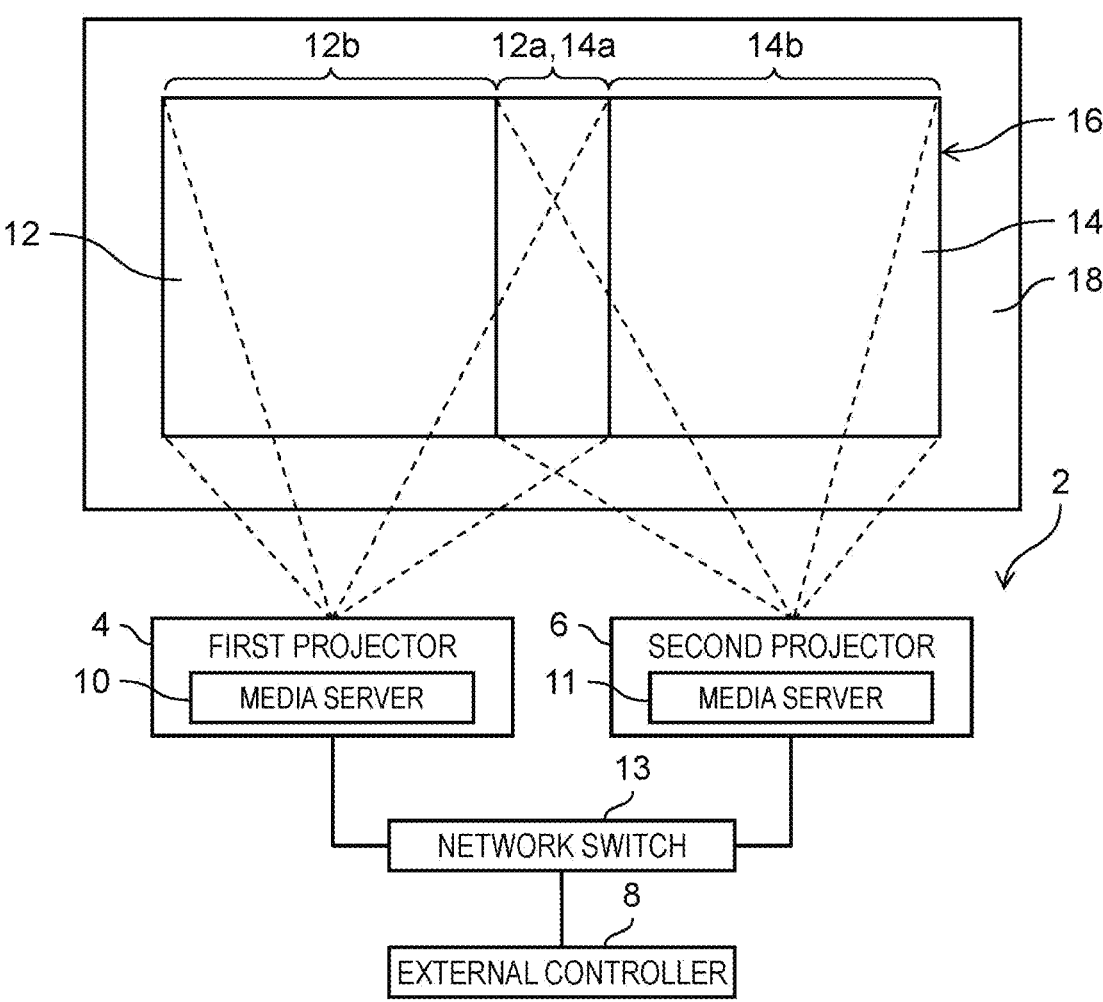
FIG. 1 is a diagram giving an overview of a projection system according to an exemplary embodiment.
Figure 2:
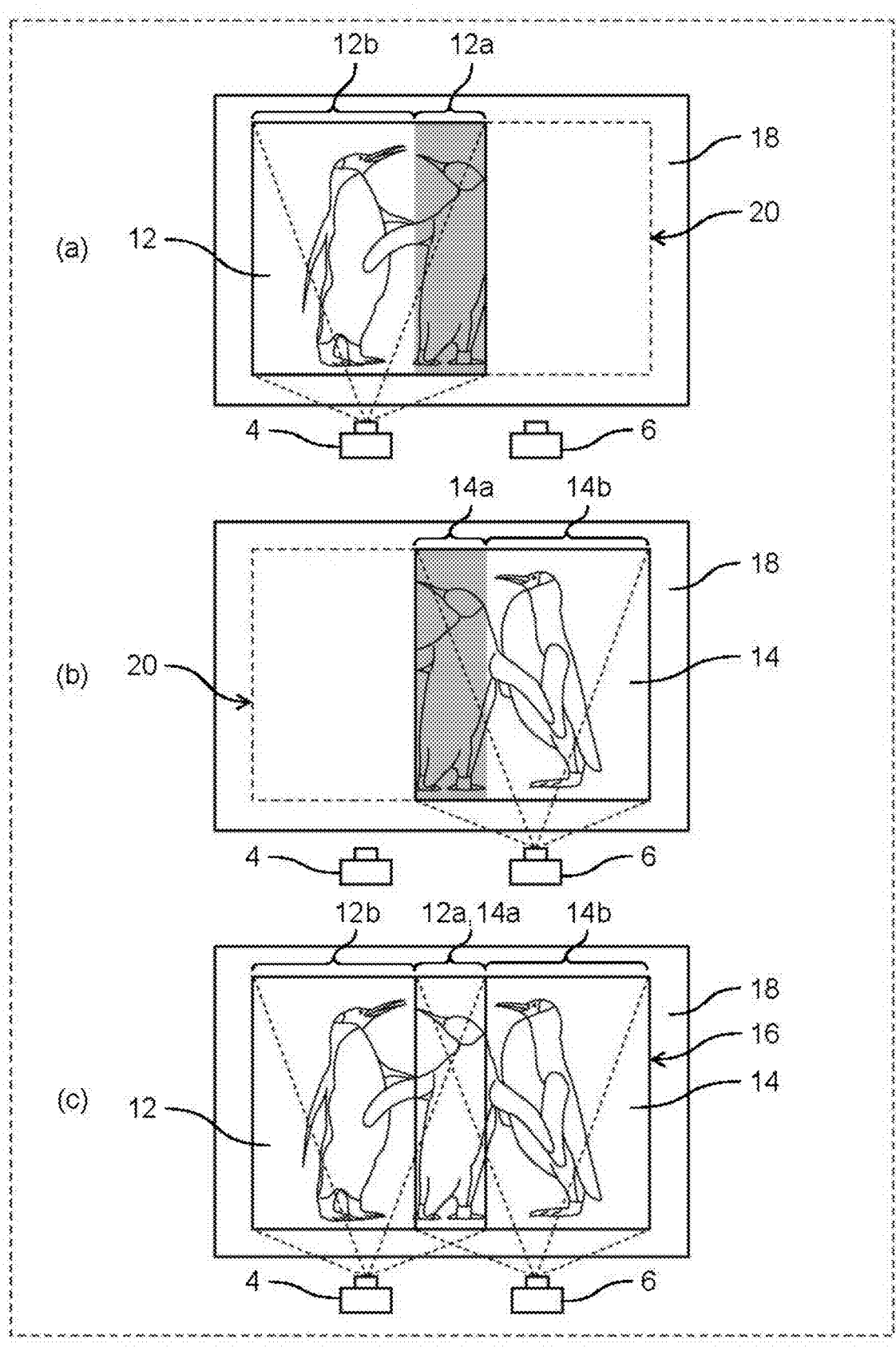
FIG. 2 is a diagram illustrating an example of a first projection image, a second projection image, and an overall projection image projected by the projection system according to the exemplary embodiment.

To begin with, overview of projection system 2 according to an exemplary embodiment will now be explained with reference to FIGS. 1 and 2. FIGS. 1 and 2 are diagrams giving an overview of a projection system according to the exemplary embodiment. FIG. 2 is a diagram illustrating an example of first projection image 12, second projection image 14, and overall projection image 16 projected by projection system 2 according to the exemplary embodiment.

As illustrated in FIG. 1, projection system 2 according to the exemplary embodiment includes first projector 4, second projector 6, and external controller 8. Media server 10 and media server 11 are built in first projector 4 and second projector 6, respectively.

Projection system 2 is a multi-projection system that projects one large overall projection image 16 onto projection surface 18 by connecting first projection image 12 and second projection image 14 that are projected from first projector 4 and second projector 6, respectively. Note that the "projection image" may be projected content of either a still image or a moving image, or may be projected content including both a still image and a moving image.

First projector 4 is a projector for projecting first projection image 12 on projection surface 18, and projects first projection image 12 based on projection content retained on media server 10.

Second projector 6 is a projector for projecting second projection image 14 on projection surface 18, and projects second projection image 14 based on projection content retained on media server 11.

External controller 8 is a personal computer, for example, and is communicably connected to media server 10 and media server 11 via a local area network (LAN) cable using the Internet protocols such as TCP/IP. Specifically, external controller 8 is connected to media server 10 and media server 11 via network switch 13. Note that the connection between external controller 8, and media server 10 and media server 11 is not limited to wired connection, and may also be connection established by various types of wireless communication. As examples of the various types of wireless communication, a radio frequency (RF) such as WiFi (registered trademark), WiMax (registered trademark), wireless local area network (WLAN), WiFi Direct, LiFi (Light Fidelity), ZigBee (registered trademark), or Bluetooth (registered trademark) may be used, or optical communication such as infrared communication may also be used.

Projection system 2 which is a multi-projection system performs what is called edge blending. With edge blending, first projection image 12 and second projection image 14 are projected on projection surface 18 in such a manner that the right end portion of first projection image 12 and the left end portion of second projection image 14 overlap with each other.

(a) of FIG. 2 is a diagram illustrating a projection resultant of driving only first projector 4. As illustrated in (a) of FIG. 2, first projection image 12 projected by first projector 4 is an image of a left portion of original projection image 20, the left portion being clipped out from original projection image 20. The right end portion of first projection image 12, that is, overlapping area 12a overlapping with second projection image 14 has a lower luminance than that of other area 12b.

(b) of FIG. 2 is a diagram illustrating a projection resultant of driving only second projector 6. As illustrated in (b) of FIG. 2, second projection image 14 projected by second projector 6 is an image of a right portion of original projection image 20, the right portion being clipped out from original projection image 20. The left end portion, that is, overlapping area 14a of second projection image 14 overlapping with first projection image 12 has a lower luminance than that of other area 14b.

(c) of FIG. 2 is a diagram illustrating a projection resultant of driving both of first projector 4 and second projector 6. As illustrated in (c) of FIG. 2, with overlapping area 12a of first projection image 12 overlapping with overlapping area 14a of second projection image 14, overall projection image 16 is projected on projection surface 18. Overall projection image 16 is the same image as original projection image 20 prior to clipping of first projection image 12 (or second projection image 14). In overall projection image 16, the area where overlapping area 12a of first projection image 12 overlaps with overlapping area 14a of second projection image 14 has a luminance that is substantially equal to the luminance of the other areas.

External controller 8 generates a first scenario file (an example of first command data) and a second scenario file (an example of second command data), and transmits the generated first scenario file and second scenario file to media server 10 and media server 11, respectively.

Media server 10 on first projector 4 controls to drive first projector 4 based on the first scenario file from external controller 8. Media server 11 on second projector 6 controls to drive second projector 6 based on the second scenario file from external controller 8.

1-2. Functional Configuration of Media Server

Figure 3:
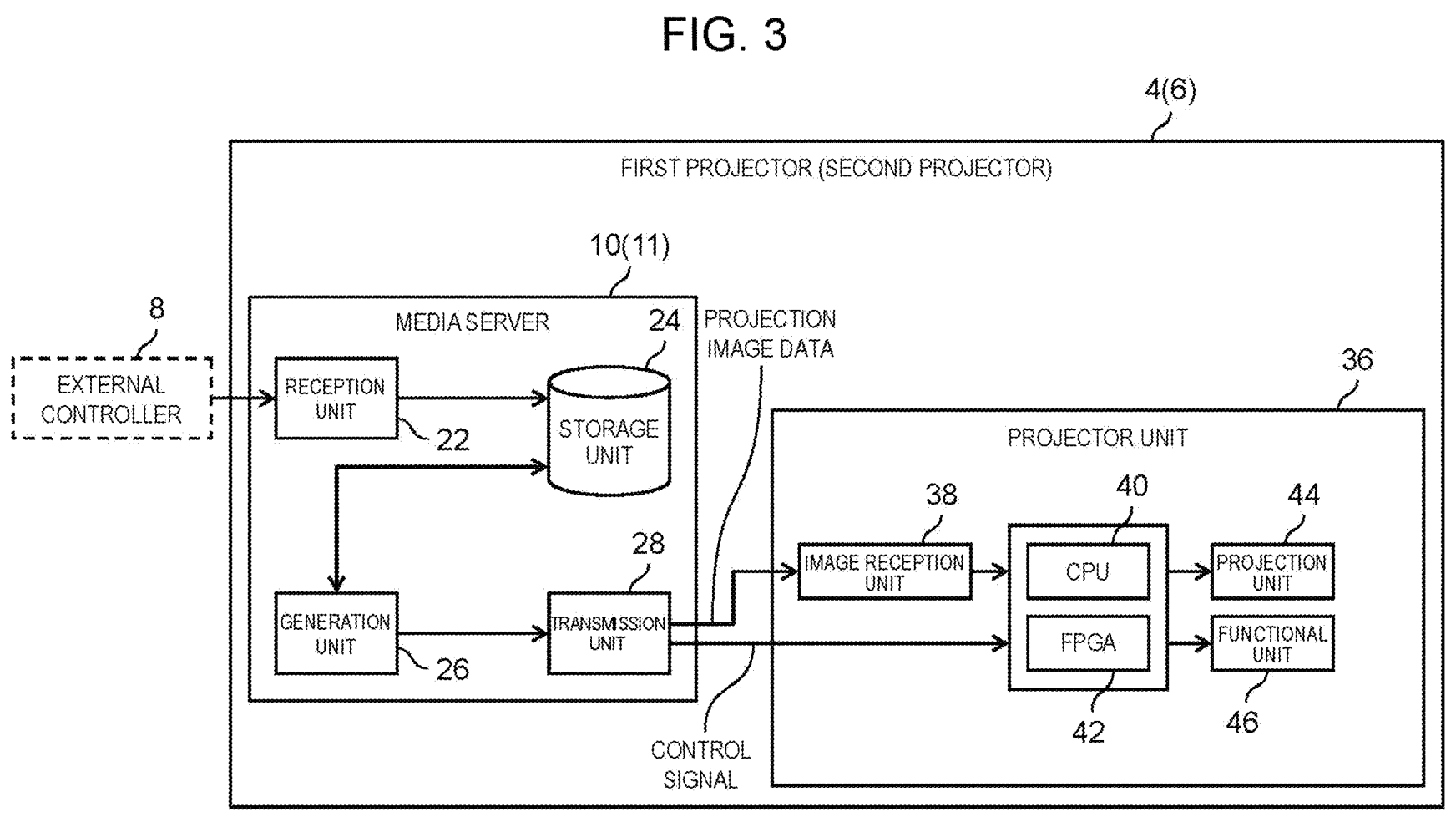
Figure 4:
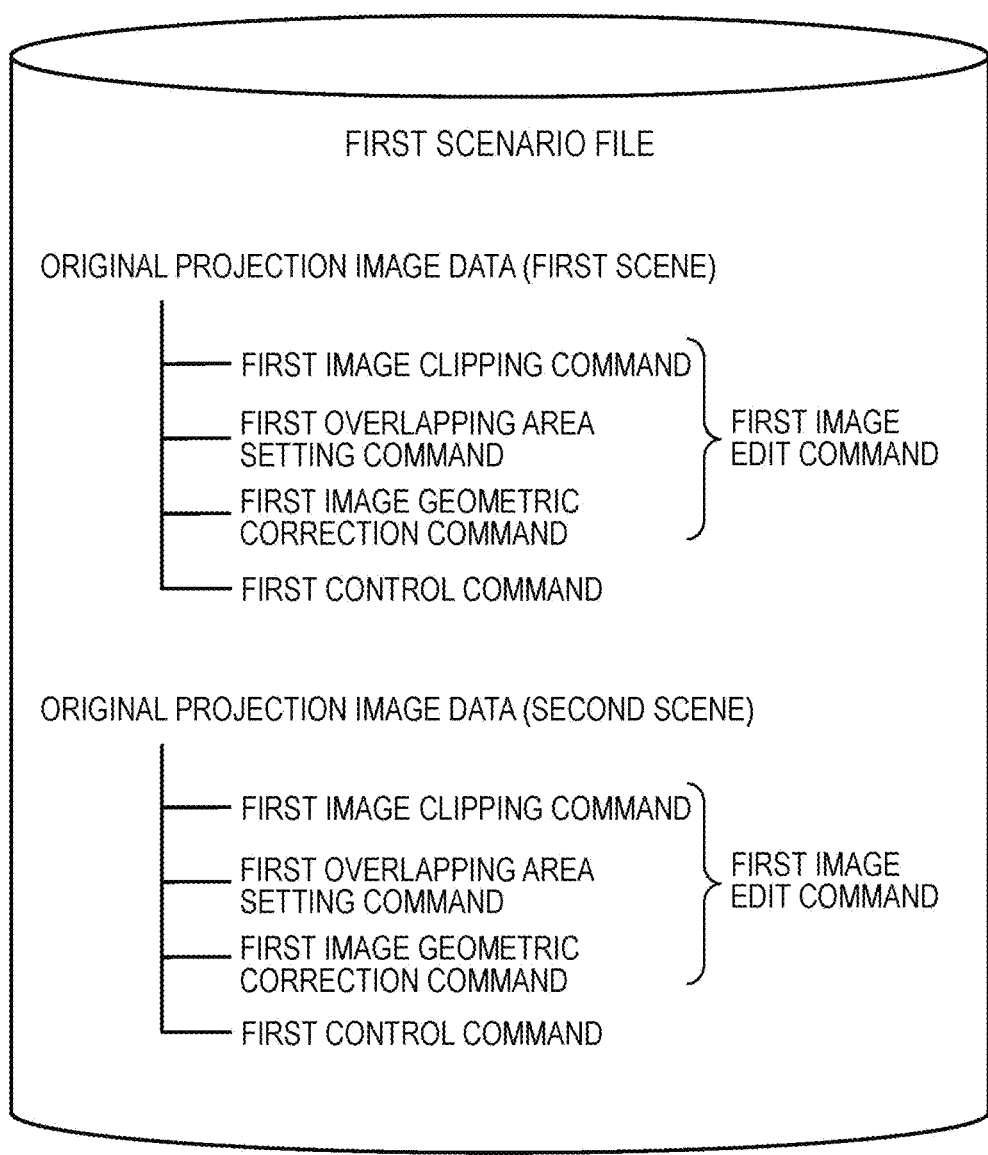
FIG. 4 is a diagram illustrating an example of a first scenario file according to the exemplary embodiment.
Figure 5:
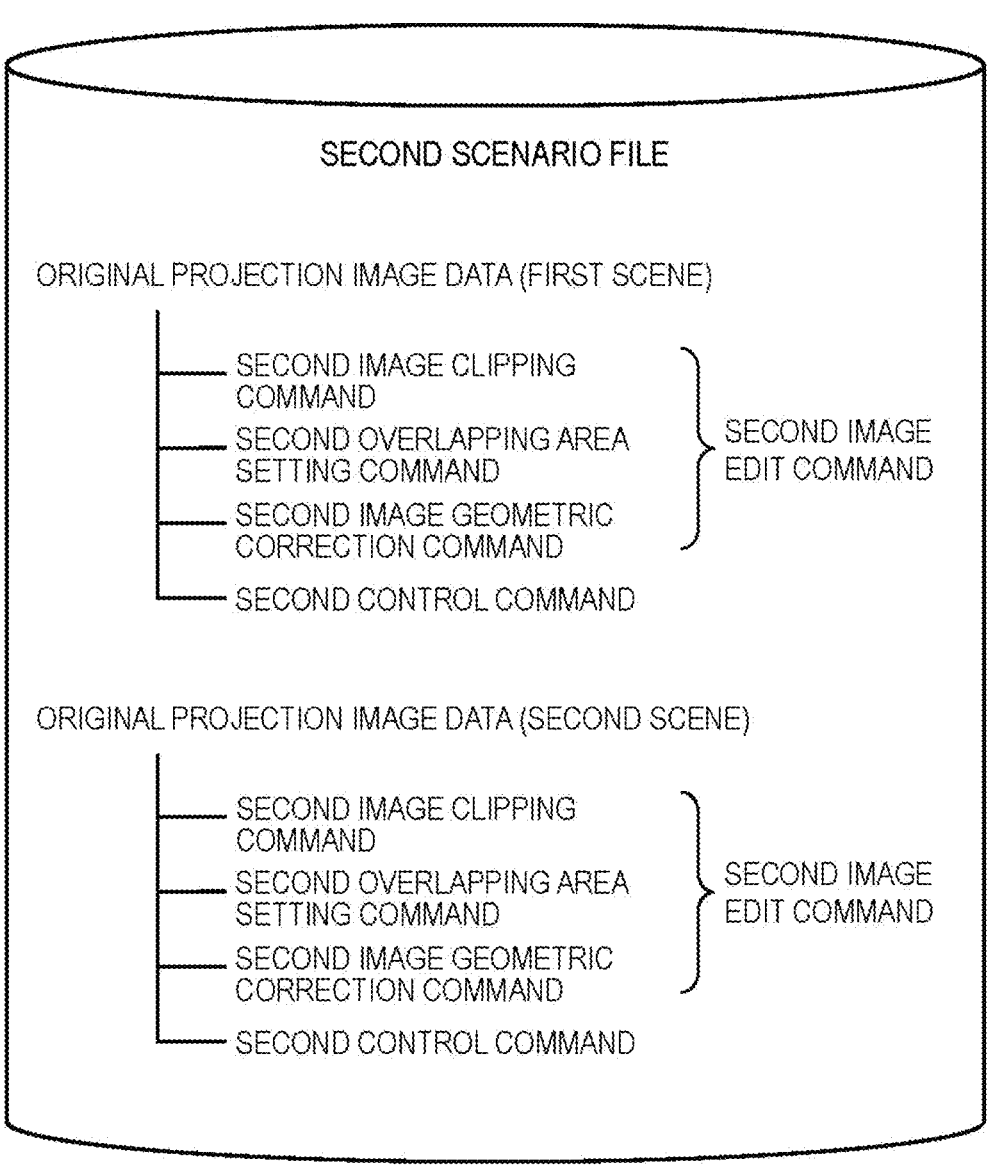
FIG. 5 is a diagram illustrating an example of a second scenario file according to the exemplary embodiment.
Figure 6:
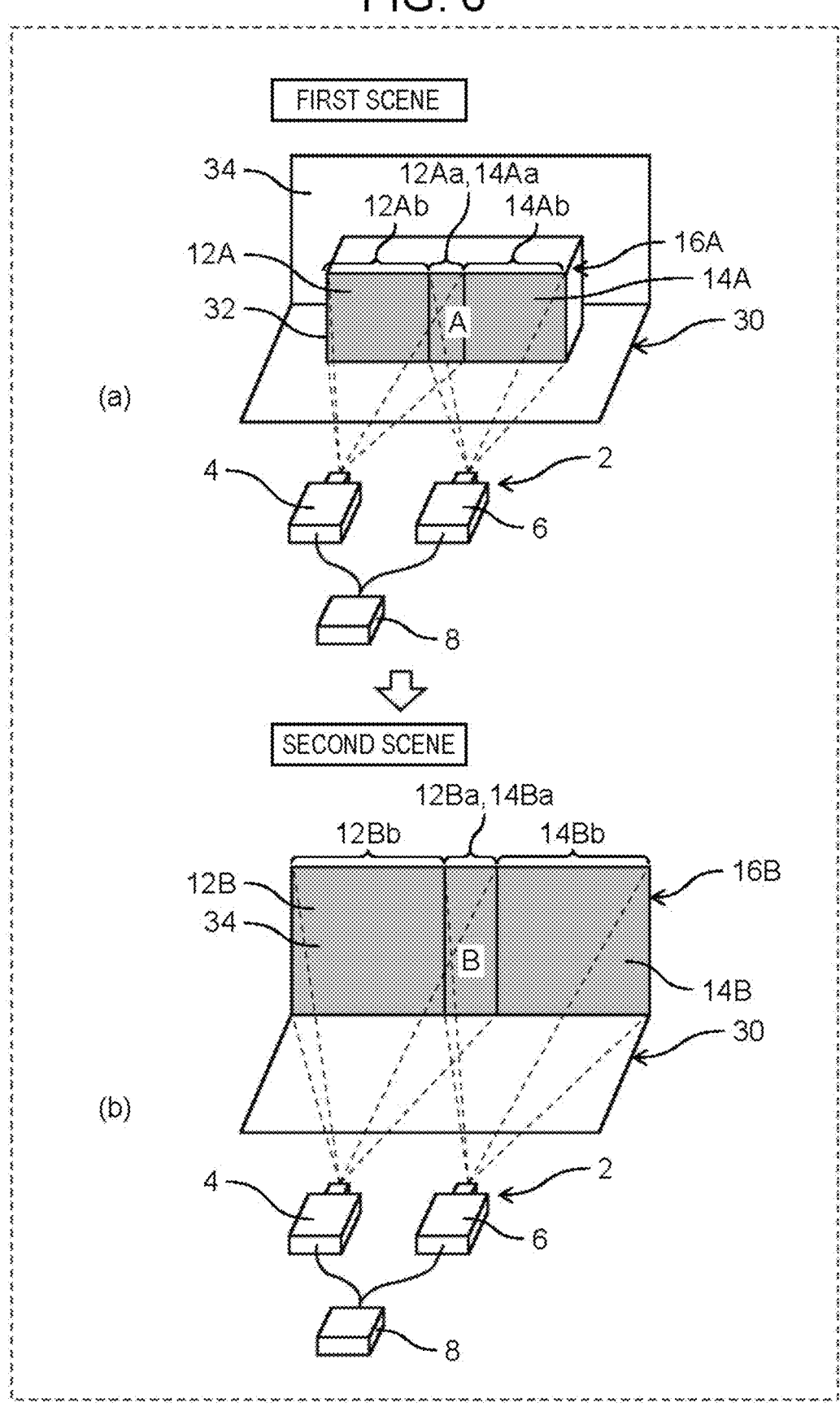
FIG. 6 is a diagram illustrating an application example of the projection system according to the exemplary embodiment.

A functional configuration of media server in each of first projector 4 and second projector according to the exemplary embodiment will now be explained with reference to FIGS. 3 to 6. FIG. 3 is a block diagram illustrating a functional configuration of media server 10 (11) according to the exemplary embodiment. FIG. 4 is a diagram illustrating an example of the first scenario file according to the exemplary embodiment. FIG. 5 is a diagram illustrating an example of the second scenario file according to the exemplary embodiment. FIG. 6 is a diagram illustrating an application example of projection system 2 according to the exemplary embodiment.

As illustrated in FIG. 3, media server 10 includes reception unit 22 (an example of a first reception unit), storage unit 24, generation unit 26, and transmission unit 28 as functional configurations. Media server 11 also includes reception unit 22 (an example of a second reception unit), storage unit 24, generation unit 26, and transmission unit 28 as functional configurations, in the same manner as media server 10.

Reception unit 22 on media server 10 receives the first scenario file from external controller 8, and stores the received first scenario file in storage unit 24 on media server 10.

Reception unit 22 on media server 11 receives the second scenario file from external controller 8, and stores the received second scenario file in storage unit 24 on media server 11.

Examples of the first scenario file and the second scenario file will now be explained with reference to FIGS. 4 and 5. In the explanation hereunder, an example in which projection system 2 is applied to projection mapping on stage 30 of a play, as illustrated in FIG. 6, will be used. In the example illustrated in FIG. 6, a first scene of the play is performed, and a second scene of the play is then performed.

Specifically, as illustrated in (a) of FIG. 6, in the first scene, the play is performed with stage furnishings 32 installed on stage 30. First projection image 12A and second projection image 14A are projected from first projector 4 and second projector 6, respectively, using the front surface of stage furnishings 32 (the surface facing the audience) as a projection surface. By joining first projection image 12A and second projection image 14A, overall projection image 16A for the first scene is projected on the front surface of stage furnishings 32. Note that, for the convenience of description, in (a) of FIG. 6, a character "A" representing overall projection image 16A is illustrated on the front surface of stage furnishings 32.

During the second scene, the play is performed after stage furnishings 32 are withdrawn from stage 30, as illustrated in (b) of FIG. 6. First projection image 12B and second projection image 14B are projected from first projector 4 and second projector 6, respectively, with the front surface (the surface facing the audience) of backdrop 34 installed behind stage 30 as a projection surface. By joining first projection image 12B and second projection image 14B, overall projection image 16B for the second scene is projected on the front surface of backdrop 34. Note that, for the convenience of description, in (b) of FIG. 6, a character "B" representing overall projection image 16B is illustrated on the front surface of backdrop 34.

FIG. 4 illustrates a configuration of the first scenario file received by media server 10 on first projector 4 from external controller 8. As illustrated in FIG. 4, the first scenario file includes original projection image data (first scene), a first image clipping command, a first overlapping area setting command, a first image geometric correction command, and a first control command. In the following description, the first image clipping command, the first overlapping area setting command, and the first image geometric correction command may be collectively referred to as a "first image edit command".

The original projection image data (first scene) is image data representing an original projection image that is the source of overall projection image 16A for the first scene.

The first image clipping command is a command for instructing media server 10 to obtain a first projection image data by clipping first projection image 12A for the first scene, from the original projection image represented by the original projection image data (first scene). The first image clipping command is linked to the original projection image data (first scene). The first image clipping command includes position coordinates in original projection image 20.

The first overlapping area setting command is a command for instructing media server 10 to set overlapping area 12Aa of first projection image 12A and to make the luminance of overlapping area 12Aa lower than the luminance of other area 12Ab. The first overlapping area setting command is linked to the original projection image data (first scene).

The first image geometric correction command is a command for instructing media server 10 to perform a geometric correction for ensuring that first projection image 12A projected on the front surface of stage furnishings 32 is not distorted. The first image geometric correction command is linked to the original projection image data (first scene). As the geometric correction, various types of geometric distortion corrections can be applied. For example, four-corner correction may be applied to each vertex of a rectangular projection image, or the correction may be a point correction applied by setting a plurality of N×M points in a grid-like arrangement (where N and M are integers) in the projection image, and using each of such points as a starting point.

The first control command is a command for instructing media server 10 to generate a first control signal. The first control signal is a signal for controlling driving of first projector 4. Specifically, the first control signal is a signal for controlling projection functions (functions of projection unit 44 and functional unit 46, to be described later), such as the focus, zooming, and luminance of a light source of first projector 4, so that first projection image 12A is projected on the front surface of stage furnishings 32, in a manner focused on a predetermined area. The first control command is linked to the original projection image data (first scene).

Furthermore, as illustrated in FIG. 4, the first scenario file includes original projection image data (second scene), a first image clipping command, a first overlapping area setting command, a first image geometric correction command, and a first control command.

The original projection image data (second scene) is image data representing an original projection image that is the source of overall projection image 16B for the second scene. Note that the second scene may be a scene temporally subsequent to the first scene.

The first image clipping command is a command for instructing media server 10 to obtain the first projection image data by clipping first projection image 12B for the second scene, from the original projection image represented by the original projection image data (second scene). The first image clipping command is linked to the original projection image data (second scene). The first image clipping command includes position coordinates in original projection image 20.

The first overlapping area setting command is a command for instructing media server 10 to set overlapping area 12Ba of first projection image 12B and to make the luminance of overlapping area 12Ba lower than the luminance of other area 12Bb. The first overlapping area setting command is linked to the original projection image data (second scene).

The first image geometric correction command is a command for instructing media server 10 to perform a geometric correction for ensuring that first projection image 12B projected on the front surface of backdrop 34 is not distorted. The first image geometric correction command is linked to the original projection image data (second scene).

The first control command is a command for instructing media server 10 to generate a first control signal. The first control signal is a signal for controlling driving of first projector 4. Specifically, the first control signal is a signal for controlling projection functions, such as the focus, zooming, and luminance of a light source of first projector 4, so that first projection image 12B is projected on onto the front surface of backdrop 34, in a manner focused on a predetermined area. The first control command is linked to the original projection image data (second scene).

Note that the first image clipping command linked to the original projection image data (first scene) and the first image clipping command linked to the original projection image data (second scene) may be commands having the same content or mutually different content. The first control command linked to the original projection image data (first scene) and the first control command linked to the original projection image data (second scene) are commands having mutually different content.

FIG. 5 illustrates a configuration of the second scenario file received by media server 11 of second projector 6 from external controller 8. Moreover, as illustrated in FIG. 5, the second scenario file includes original projection image data (first scene), a second image clipping command, a second overlapping area setting command, a second image geometric correction command, and a second control command. In the following description, the second image clipping command, the second overlapping area setting command, and the second image geometric correction command may be collectively referred to as a "second image edit command". In addition, each of the scene in the second scenario file is temporally synchronized with corresponding one of the scenes in the first scenario file.

The original projection image data (first scene) is image data representing an original projection image that is the source of overall projection image 16A for the first scene.

The second image clipping command is a command for instructing media server 11 to obtain the second projection image data by clipping second projection image 14A for the first scene, from the original projection image represented by the original projection image data (first scene). The second image clipping command is linked to the original projection image data (first scene). Note that the second image clipping command includes position coordinates in original projection image 20. These position coordinates are different from those in the first image clipping command.

The second overlapping area setting command is a command for instructing media server 11 to set overlapping area 14Aa of second projection image 14A and to make the luminance of overlapping area 14Aa lower than the luminance of other area 14Ab. The second overlapping area setting command is linked to the original projection image data (first scene).

The second image geometric correction command is a command for instructing media server 11 to perform a geometric correction for ensuring that second projection image 14A projected on the front surface of stage furnishings 32 is not distorted. The second image geometric correction command is linked to the original projection image data (first scene).

The second control command is a command for instructing media server 11 to generate a second control signal. The second control signal is a signal for controlling driving of second projector 6. Specifically, the second control signal is a signal for controlling projection functions, such as the focus, zooming, and luminance of a light source of second projector 6, so that second projection image 14A is projected on the front surface of stage furnishings 32, in a manner focused on a predetermined area. The second control command is linked to the original projection image data (first scene).

Furthermore, as illustrated in FIG. 5, the second scenario file includes original projection image data (second scene), a second image clipping command, a second overlapping area setting command, a second image geometric correction command, and a second control command.

The original projection image data (second scene) is image data representing an original projection image that is the source of overall projection image 16B for the second scene.

The second image clipping command is a command for instructing media server 11 to obtain the second projection image data by clipping second projection image 14B for the second scene, from the original projection image represented by the original projection image data (second scene). The second image clipping command is linked to the original projection image data (second scene). Note that the second image clipping command includes position coordinates in original projection image 20. These position coordinates are different from those in the first image clipping command.

The second overlapping area setting command is a command for instructing media server 11 to set overlapping area 14Ba of second projection image 14B and to make the luminance of overlapping area 14Ba lower than the luminance of other area 14Bb. The second overlapping area setting command is linked to the original projection image data (second scene).

The second image geometric correction command is a command for instructing media server 11 to perform a geometric correction for ensuring that second projection image 14B projected onto the front surface of backdrop 34 is not distorted. The second image geometric correction command is linked to the original projection image data (second scene).

The second control command is a command for instructing media server 11 to generate a second control signal. The second control signal is a signal for controlling driving of second projector 6. Specifically, the second control signal is a signal for controlling projection functions, such as the focus, zooming, and luminance of a light source of second projector 6, so that second projection image 14B is projected on the front surface of backdrop 34, in a manner focused on a predetermined area. The second control command is linked to the original projection image data (second scene).

Note that the second image clipping command linked to the original projection image data (first scene) and the second image clipping command linked to the original projection image data (second scene) are commands having the same content. The second control command linked to the original projection image data (first scene) and the second control command linked to the original projection image data (second scene) are commands having mutually different content.

Returning to FIG. 3, storage unit 24 on media server 10 is a memory for storing therein the first scenario file received by reception unit 22 of media server 10.

Storage unit 24 on media server 11 is a memory for storing therein the second scenario file received by reception unit 22 on media server 11.

Generation unit 26 on media server 10 reads the first scenario file from storage unit 24 on media server 10, and generates the first projection image data and the first control signal based on the read first scenario file.

Specifically, generation unit 26 on media server 10 obtains the first projection image data by clipping first projection image 12A for the first scene from the original projection image represented by the original projection image data (first scene), based on the original projection image data (first scene) and on the first image edit command linked to the original projection image data (first scene) included in the first scenario file. Generation unit 26 on media server 10 also generates the first control signal to be linked to the first projection image data representing first projection image 12A for the first scene, based on the first control command linked to the original projection image data (first scene) included in the first scenario file.

Generation unit 26 on media server 10 obtains the first projection image data by clipping first projection image 12B for the second scene from the original projection image represented by the original projection image data (second scene), based on the original projection image data (second scene) and on the first image edit command linked to the original projection image data (second scene) included in the first scenario file. Generation unit 26 on media server 10 also generates the first control signal to be linked to the first projection image data representing first projection image 12B for the second scene, based on the first control command linked to the original projection image data (second scene) included in the first scenario file.

Furthermore, generation unit 26 on media server 11 reads the second scenario file from storage unit 24 on media server 11, and generates the second projection image data and the second control signal based on the read second scenario file.

Specifically, generation unit 26 on media server 11 obtains the second projection image data by clipping second projection image 14A for the first scene from the original projection image represented by the original projection image data (first scene), based on the original projection image data (first scene) and on the second image edit command linked to the original projection image data (first scene) included in the second scenario file. Generation unit 26 on media server 11 also generates the second control signal to be linked to the second projection image data representing second projection image 14A for the first scene, based on the second control command linked to the original projection image data (first scene) included in the second scenario file.

Furthermore, generation unit 26 on media server 11 obtains the second projection image data by clipping second projection image 14B for the second scene from the original projection image represented by the original projection image data (second scene), based on the original projection image data (second scene) and on the second image edit command linked to the original projection image data (second scene) included in the second scenario file. Generation unit 26 on media server 11 also generates the second control signal to be linked to the second projection image data representing second projection image 14B for the second scene, based on the second control command linked to the original projection image data (second scene) included in the second scenario file.

Transmission unit 28 on media server 10 sequentially transmits the first projection image data and the first control signal for the first scene, and the first projection image data and the first control signal for the second scene, all of which are generated by generation unit 26 on media server 10, to projector unit 36 on first projector 4. In other words, projector unit 36 on first projector 4 acquires the first projection image data and the first control signal for the first scene, and the first projection image data and the first control signal for the second scene. Specifically, the first projection image data is transmitted to projection unit 44 via image reception unit 38, central processing unit (CPU) 40, and field-programmable gate array (FPGA) 42 included in projector unit 36 on first projector 4. The first control signal is transmitted to functional unit 46 (e.g., lens) via CPU 40 and FPGA 42 included in projector unit 36 on first projector 4. At this time, CPU 40 and FPGA 42 perform processes such as editing the first projection image data, and converting the first projection image data and the first control signal into signals in a format that can be received by projection unit 44 and functional unit 46, respectively.

Furthermore, transmission unit 28 on media server 11 sequentially transmits the second projection image data and the second control signal for the first scene, and the second projection image data and the second control signal for the second scene, all of which are generated by generation unit 26 on media server 11, to projector unit 36 on second projector 6. In other words, projector unit 36 on second projector 6 acquires the second projection image data and the second control signal for the first scene, and the second projection image data and the second control signal for the second scene. Specifically, the second projection image data is transmitted to projection unit 44 via image reception unit 38, CPU 40, and FPGA 42 included in projector unit 36 on second projector 6. The second control signal is transmitted to functional unit 46 (e.g., lens) via CPU 40 and FPGA 42 included in projector unit 36 on second projector 6.

1-3. Operation of Projection System

Figure 7:
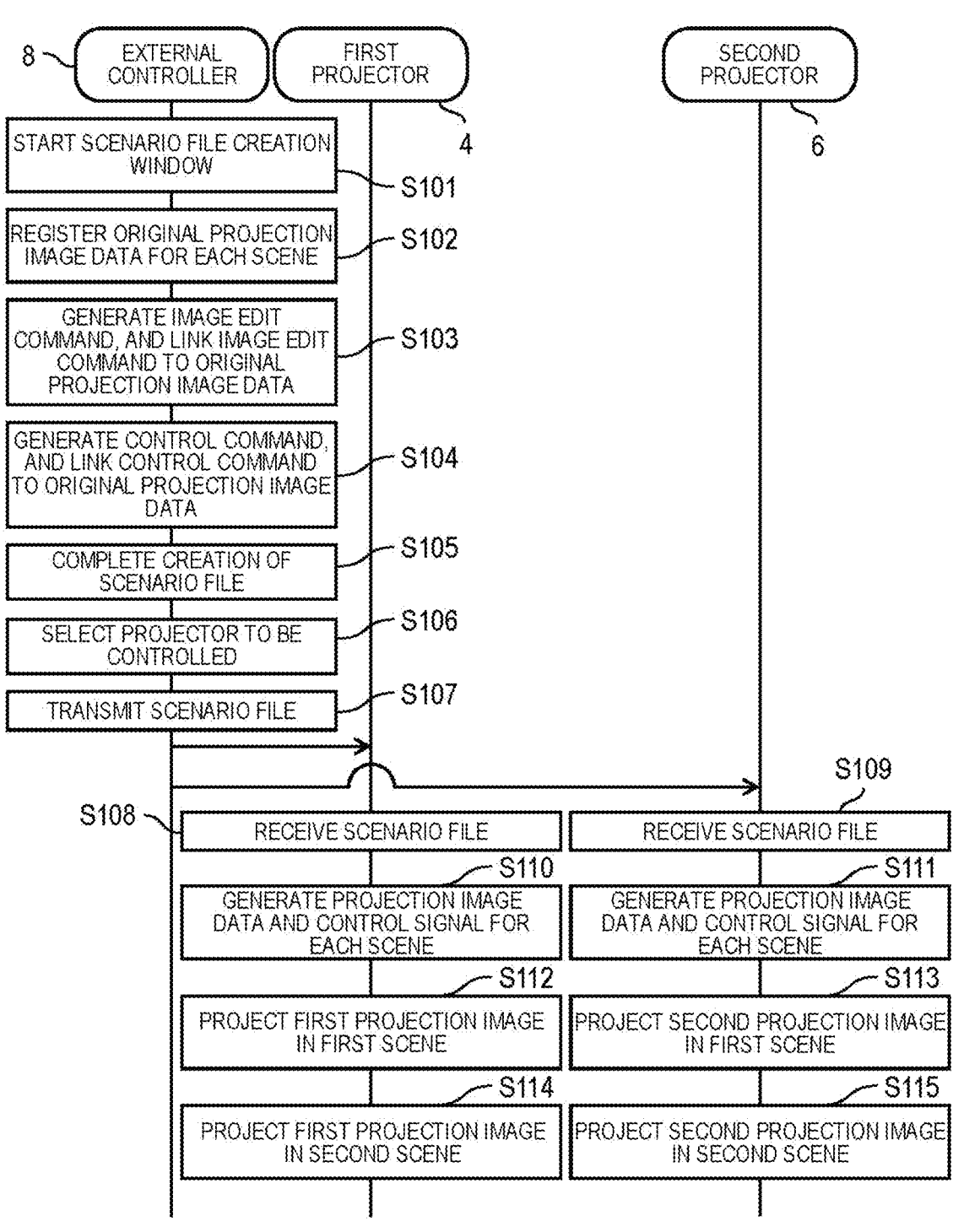
FIG. 7 is a sequence chart illustrating the sequence of an operation of the projection system according to the exemplary embodiment.

An operation of projection system 2 according to the exemplary embodiment will now be explained with reference to FIG. 7. FIG. 7 is a sequence chart illustrating the sequence of an operation of projection system 2 according to the exemplary embodiment.

As illustrated in FIG. 7, to begin with, a user makes an operation on external controller 8 to start a scenario file creation window (S101). The user then registers, on the scenario creation window, original projection image data (first scene) as a source of overall projection image 16A for the first scene, and original projection image data (second scene) as a source of overall projection image 16B for the second scene (S102).

Then, on the scenario creation window, the user: a) generates the first image edit command for the first scene, and links the generated first image edit command to the original projection image data (first scene); b) generates the second image edit command for the first scene, and links the generated second image edit command to the original projection image data (first scene); c) generates the first image edit command for the second scene, and links the generated first image edit command to the original projection image data (second scene); and d) generates the second image edit command for the second scene, and links the generated second image edit command to the original projection image data (second scene) (S103).

Specifically, the user can generate the first image edit command (second image edit command) for the first scene by making an operation, on the screen of external controller 8, for example, for increasing or decreasing the size of the range to be clipped from the original projection image for the first scene, as first projection image 12A (second projection image 14A). In the same manner, the user can generate the first image edit command (second image edit command) for the second scene by making an operation, on the screen of external controller 8, for example, for increasing or decreasing the size of the range to be clipped from the original projection image for the second scene, as first projection image 12B (second projection image 14B).

Note that, instead of such a configuration, the first image edit command (second image edit command) for the first scene may be generated by automatically clipping first projection image 12A (second projection image 14A) from the original projection image for the first scene, on the scenario file creation window, based on captured data obtained by capturing an image of the front surface of stage furnishings 32 with a camera (not illustrated). In the same manner, the first image edit command (second image edit command) for the second scene may be generated by automatically clipping first projection image 12B (second projection image 14B) from the original projection image for the second scene, on the scenario file creation window, based on captured data obtained by capturing an image of the front surface of backdrop 34 with the camera.

After step S103, on the scenario creation window, the user: a) generates the first control command for the first scene, and links the generated first control command to the original projection image data (first scene); b) generates the second control command for the first scene, and links the generated second control command to the original projection image data (first scene); c) generates the first control command for the second scene, and links the generated first control command to the original projection image data (second scene); and d) generates the second control command for the second scene, and links the generated second control command to the original projection image data (second scene) (S104).

As a result, creations of the first scenario file and the second scenario file are completed (S105). The user then selects first projector 4 and second projector 6 as projectors to be controlled, on the scenario creation window (S106). External controller 8 then transmits the first scenario file and the second scenario file to media server 10 on first projector 4 and media server 11 on second projector 6, respectively (S107).

Reception unit 22 of media server 10 on first projector 4 then receives the first scenario file from external controller 8 (S108).

Reception unit 22 of media server 11 on second projector 6 then receives the second scenario file from external controller 8 (S109).

Generation unit 26 of media server 10 on first projector 4 generates the first projection image data and the first control signal for the first scene, and the first projection image data and the first control signal for the second scene, based on the first scenario file (S110).

Generation unit 26 of media server 11 on second projector 6 generates the second projection image data and the second control signal for the first scene, and the second projection image data and the second control signal for the second scene, based on the second scenario file (S111).

Transmission unit 28 of media server 10 on first projector 4 transmits the first projection image data and the first control signal for the first scene, to projector unit 36 on first projector 4. Transmission unit 28 of media server 11 on second projector 6 also transmits the second projection image data and the second control signal for the first scene, to projector unit 36 of second projector 6.

Based on the first projection image data and the first control signal for the first scene from media server 10, projector unit 36 of first projector 4 projects first projection image 12A on the front surface of stage furnishings 32 in the first scene (S112). At the same time, based on the second projection image data and the second control signal for the first scene from media server 11, projector unit 36 of second projector 6 projects second projection image 14A on the front surface of stage furnishings 32 in the first scene (S113). As a result, during the first scene, overall projection image 16A for the first scene is projected on the front surface of stage furnishings 32 (see (a) of FIG. 6).

After the first scene, transmission unit 28 of media server 10 on first projector 4 also transmits the first projection image data and the first control signal for the second scene, to projector unit 36 of first projector 4. Transmission unit 28 of media server 11 on second projector 6 also transmits the second projection image data and the second control signal for the second scene, to projector unit 36 of second projector 6.

Based on the first projection image data and the first control signal for the second scene, received from media server 10, projector unit 36 of first projector 4 projects first projection image 12B on the front surface of backdrop 34, in the second scene (S114). At the same time, based on the second projection image data and the second control signal for the second scene from media server 11, projector unit 36 of second projector 6 projects second projection image 14B on the front surface of backdrop 34, in the second scene (S115). As a result, during the second scene, overall projection image 16B for the second scene is projected on the front surface of backdrop 34 (see (b) of FIG. 6).

1-4. Advantageous Effects

In the present exemplary embodiment, projection system 2 is a system configured to project first projection image 12 and second projection image 14 on projection surface 18 in such a manner that an end portion of first projection image 12 and an end portion of second projection image 14 overlap each other. Projection system 2 includes first projector 4 configured to project first projection image 12 on projection surface 18, and second projector 6 configured to project second projection image 14 on projection surface 18. First projector 4 is configured to acquire first projection image data representing first projection image 12 that is a clipping of original projection image 20, and a first control signal that is linked to the first projection image data and that is for controlling driving of first projector 4. Second projector 6 is configured to acquire second projection image data representing second projection image 14 that is a clipping of original projection image 20, and a second control signal that is linked to the second projection image data and that is for controlling driving of second projector 6.

With this, driving of first projector 4 can be controlled in such a manner that first projection image 12 is projected onto projection surface 18 in a projection mode (e.g., focus, zoom, luminance of a light source) suitable for first projection image 12. Furthermore, driving of second projector 6 can be controlled in such a manner that second projection image 14 is projected on projection surface 18 in a projection mode suitable for second projection image 14. As a result, even when a plurality of projectors including first projector 4 and second projector 6 are used, driving of individual projectors can be controlled easily.

In the present exemplary embodiment, first projector 4 includes reception unit 22 configured to receive first command data from external controller 8. Second projector 6 includes reception unit 22 configured to receives second command data from external controller 8. The first command data includes a first image clipping command configured to instruct media server 10 on first projector 4 to obtain the first projection image data by clipping out first projection image 12 from original projection image 20, and a first control command configured to instruct media server 10 on first projector 4 to generate a first control signal. The second command data includes a second image clipping command configured to instruct media server 11 on second projector 6 to obtain the second projection image data by clipping out second projection image 14 from original projection image 20, and a second control command configured to instruct media server 11 on second projector 6 to generate a second control signal. Media server 10 on first projector 4 generates the first projection image data and the first control signal based on the first command data. Media server 11 on second projector 6 generates the second projection image data and the second control signal based on the second command data.

Consequently, the first projection image data and the first control signal can be generated easily based on the first command data, and the second projection image data and the second control signal can be generated easily based on the second command data.

Furthermore, in the present exemplary embodiment, the first command data includes a plurality of first image clipping commands and a plurality of first control commands corresponding to a plurality of types of original projection images 20, respectively. The second command data includes a plurality of second image clipping commands and a plurality of second control commands corresponding to the plurality of types of original projection images 20, respectively.

Accordingly, for each type (for example, for each scene) of original projection image 20, it is possible to generate the first projection image data and the first control signal, easily, based on the first command data, and to generate the second projection image data and the second control signal, easily, based on the second command data.

Furthermore, in the present exemplary embodiment, the plurality of first image clipping commands and the plurality of first control commands are commands for controlling first projector 4 at timings that are temporally different.

With this, it is possible to implement projection system 2 optimized for applications such as projection mapping on stage 30 of a play, for example.

Furthermore, in the present exemplary embodiment, the plurality of first image clipping commands are commands having the same content. The plurality of first control commands are commands having mutually different content.

With this, it is possible to implement projection system 2 optimized for applications such as projection mapping on stage 30 of a play, for example.

Furthermore, in the present exemplary embodiment, the plurality of second image clipping commands and the plurality of second control commands are commands for controlling second projector 6 at timings that are temporally different.

With this, it is possible to implement projection system 2 optimized for applications such as projection mapping on stage 30 of a play, for example.

Furthermore, in the present exemplary embodiment, the plurality of second image clipping commands are commands having the same content. The plurality of second control commands are commands having mutually different content.

With this, it is possible to implement projection system 2 optimized for applications such as projection mapping on stage 30 of a play, for example.

Furthermore, in the present exemplary embodiment, each of the first image clipping command and the second image clipping command includes position coordinates in original projection image 20. The position coordinates in the first image clipping command are different from the position coordinates in the second image clipping command.

With this, first projection image 12 and second projection image 14 can be clipped out from original projection image 20, efficiently.

Further, in the present exemplary embodiment, the method for controlling projection system 2 is a method for projecting first projection image 12 and second projection image 14 onto projection surface 18 using first projector 4 and second projector 6, respectively, in such a manner that an end portion of first projection image 12 and an end portion of second projection image 14 overlap each other. A control method for projection system 2 includes steps of: (a) obtaining first projection image data representing first projection image 12 that is a clipping of original projection image 20, and second projection image data representing second projection image 14 that is a clipping of original projection image 20; (b) transmitting the first projection image data, and a first control signal that is linked to the first projection image data and that is for controlling driving of first projector 4, to first projector 4; and (c) transmitting the second projection image data and a second control signal that is linked to the second projection image data and that is for controlling driving of second projector 6, to second projector 6.

With this, in the same manner as described above, even when a plurality of projectors including first projector 4 and second projector 6 are used, driving of individual projectors can be controlled easily.

(First Modification)

2-1. Overview of Projection System

Figure 8:
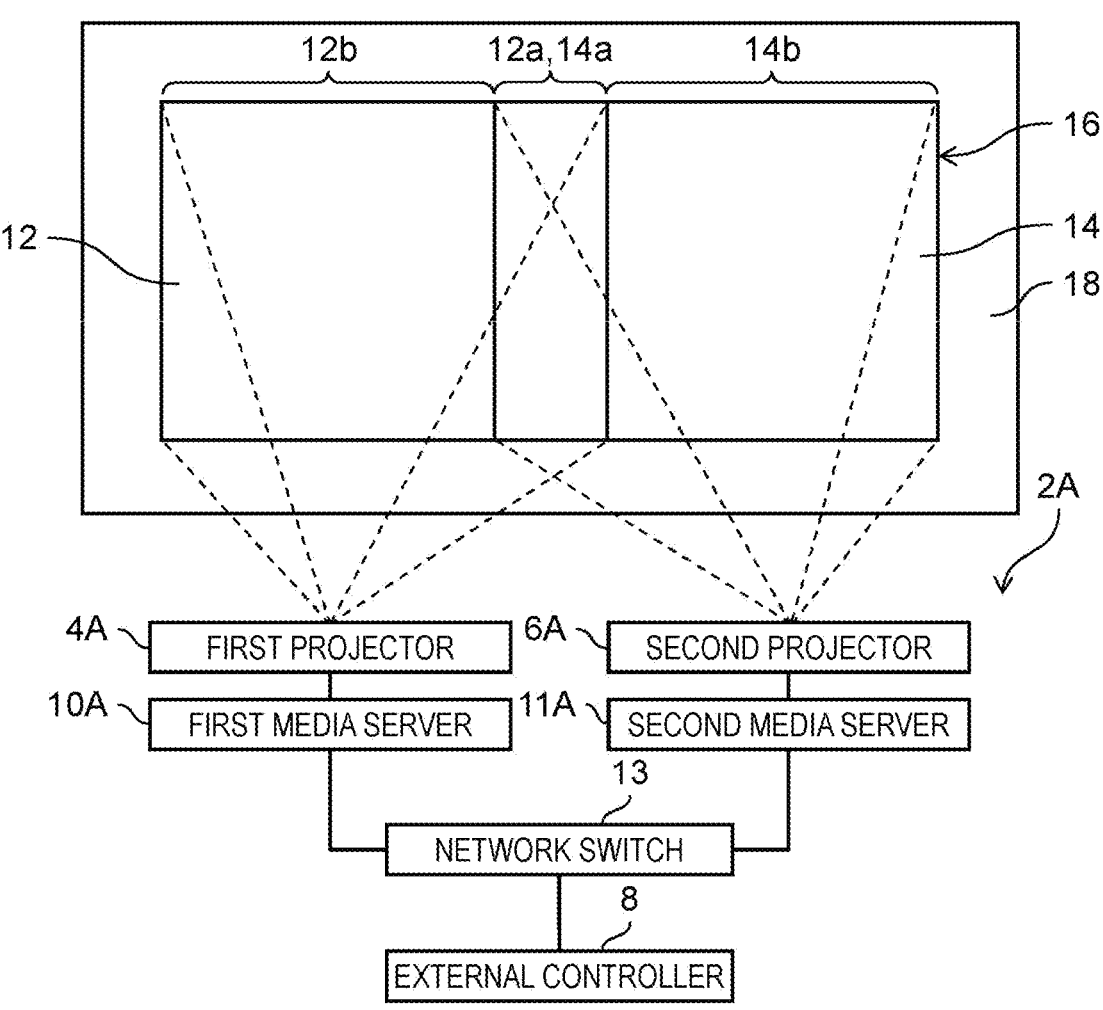
FIG. 8 is a schematic diagram of a projection system according to a first modification.

An overview of projection system 2A according to a first modification will now be explained with reference to FIG. 8. FIG. 8 is a schematic diagram of projection system 2A according to the first modification. In this modification, components identical to those in the exemplary embodiment described above are denoted by the same reference marks, and detailed descriptions thereof will be omitted.

In the above exemplary embodiment, media server 10 and media server 11 are built in first projector 4 and second projector 6, respectively. By contrast, in projection system 2A according to first modification, as illustrated in FIG. 8, first media server 10A and second media server 11A are communicably connected to first projector 4A and second projector 6A, respectively, from external.

Note that the only function provided to each of first projector 4A and second projector 6A is that of projector unit 36 (see FIG. 3) described in the exemplary embodiment.

2-2. Functional Configuration of Each Media Server

Functional configurations of first media server 10A and second media server 11A according to the first modification will be described with reference to FIG. 9. FIG. 9 is a block diagram illustrating the functional configuration of first media server 10A (second media server 11A) according to the first modification.

Each of first media server 10A and second media server 11A includes reception unit 22, storage unit 24, generation unit 26, and transmission unit 28 as functional configurations, in the same manner as in the exemplary embodiment described above.

Transmission unit 28 on first media server 10A sequentially transmits the first projection image data and the first control signal for the first scene, and the first projection image data and the first control signal for the second scene, all of which are generated by generation unit 26 on first media server 10A, to first projector 4A. Specifically, the first projection image data is transmitted to image input terminal 48 of first projector 4A. The first control signal is transmitted to network terminal 50 of first projector 4A. Note that image input terminal 48 is a high-definition multimedia interface (HDMI (registered trademark)) terminal, as an example, and network terminal 50 is a LAN terminal, as an example.

Transmission unit 28 on second media server 11A sequentially transmits the second projection image data and the second control signal for the first scene, and the second projection image data and the second control signal for the second scene, all of which are generated by generation unit 26 on second media server 11A, to second projector 6A. Specifically, the second projection image data is transmitted to image input terminal 48 of second projector 6A. The second control signal is transmitted to network terminal 50 of second projector 6A.

2-3. Operation of Projection System

Figure 10:
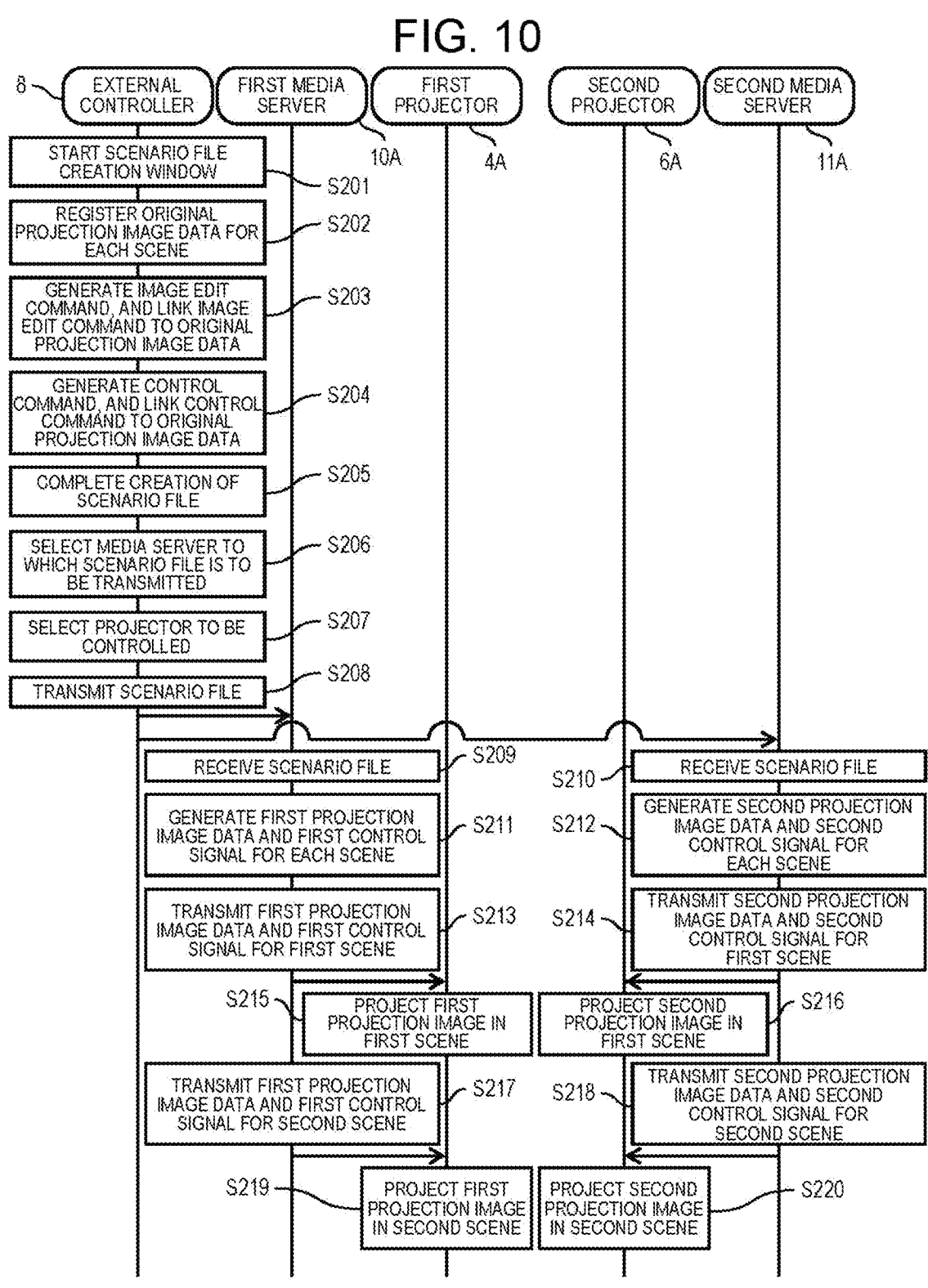
FIG. 10 is a sequence chart illustrating the sequence of an operation of the projection system according to the first modification.

An operation of projection system 2A according to the first modification will now be explained with reference to FIG. 10. FIG. 10 is a sequence chart illustrating the sequence of an operation of projection system 2A according to the first modification.

As illustrated in FIG. 10, to begin with, steps S201 to S205 are executed in the same manner as steps S101 to S105 in FIG. 7 described in the above exemplary embodiment. After step S205, the user selects first media server 10A and second media server 11A as destinations to which the first scenario file and the second scenario file are transmitted, respectively, on the scenario creation window (S206). Step S207 is then executed in the same manner as in step S106 in FIG. 7.

External controller 8 then transmits the first scenario file and the second scenario file to first media server 10A and second media server 11A, respectively (S208).

Reception unit 22 on first media server 10A receives the first scenario file from external controller 8 (S209). Reception unit 22 on second media server 11A receives the second scenario file from external controller 8 (S210).

Generation unit 26 on first media server 10A generates the first projection image data and the first control signal for the first scene, and the first projection image data and the first control signal for the second scene, based on the first scenario file (S211). Generation unit 26 on second media server 11A generates the second projection image data and the second control signal for the first scene, and the second projection image data and the second control signal for the second scene, based on the second scenario file (S212).

Transmission unit 28 on first media server 10A transmits the first projection image data and the first control signal for the first scene, to first projector 4A (S213). Transmission unit 28 on second media server 11A transmits the second projection image data and the second control signal for the first scene, to second projector 6A (S214).

Based on the first projection image data and the first control signal for the first scene, from first media server 10A, first projector 4A projects first projection image 12A on the front surface of stage furnishings 32 in the first scene, as illustrated in (a) of FIG. 6 mentioned above (S215). At the same time, based on the second projection image data and the second control signal for the first scene, from second media server 11A, second projector 6A projects second projection image 14A on the front surface of stage furnishings 32 in the first scene, as illustrated in (a) of FIG. 6 mentioned above (S216). As a result, on the front surface of stage furnishings 32, overall projection image 16A for the first scene is projected in the first scene.

After the first scene, transmission unit 28 on first media server 10A transmits the first projection image data and the first control signal for the second scene, to first projector 4A (S217). Transmission unit 28 on second media server 11A also transmits the second projection image data and the second control signal for the second scene, to second projector 6A (S218).

Based on the first projection image data and the first control signal for the second scene, from first media server 10A, first projector 4A projects first projection image 12B on the front surface of backdrop 34 in the second scene, as illustrated in (b) of FIG. 6 mentioned above (S219). At the same time, based on the second projection image data and the second control signal for the second scene, from second media server 11A, second projector 6A projects second projection image 14B on the front surface of backdrop 34 in the second scene, as illustrated in (b) of FIG. 6 described above (S220). As a result, during the second scene, overall projection image 16B for the second scene is projected on the front surface of backdrop 34.

Note that the timings at which the projection image data and the control signals are transmitted in steps S213 and S214 described above and the timings at which the projection image data and the control signals are transmitted in steps S217 and S218 described above are defined by the first scenario file and the second scenario file, respectively.

2-4. Advantageous Effects

In the present modification, by providing first media server 10A and second media server 11A as units separated from first projector 4A and second projector 6A, respectively, it is possible to use general projectors as first projector 4A and second projector 6A.

(Second Modification)

3-1. Overview of Projection System

Figure 11:
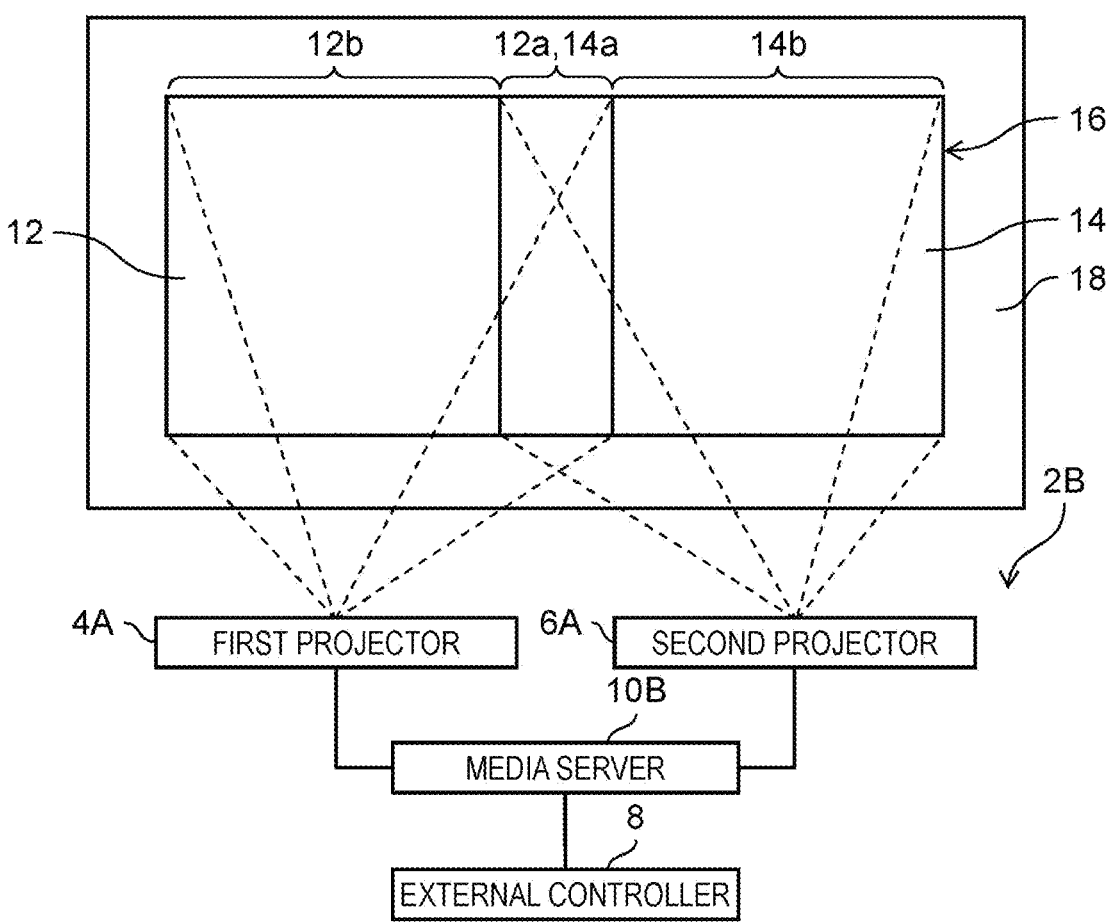
FIG. 11 is a schematic diagram of a projection system according to a second modification.

An overview of projection system 2B according to a second modification will now be explained with reference to FIG. 11. FIG. 11 is a schematic diagram of projection system 2B according to the second modification. In this modification, components identical to those in the exemplary embodiment and the first modification described above are denoted by the same reference marks, and detailed descriptions thereof will be omitted.

In the first modification, two media servers (first media server 10A and second media server 11A) are disposed correspondingly to first projector 4A and second projector 6A, respectively. By contrast, in projection system 2B according to the second modification, one media server 10B is disposed correspondingly to first projector 4A and second projector 6A, as illustrated in FIG. 11.

In the same manner as in the first modification, the only function provided to each of first projector 4A and second projector 6A is that of projector unit 36 (see FIG. 3) described in the exemplary embodiment.

3-2. Functional Configuration of Media Server

Figure 12:
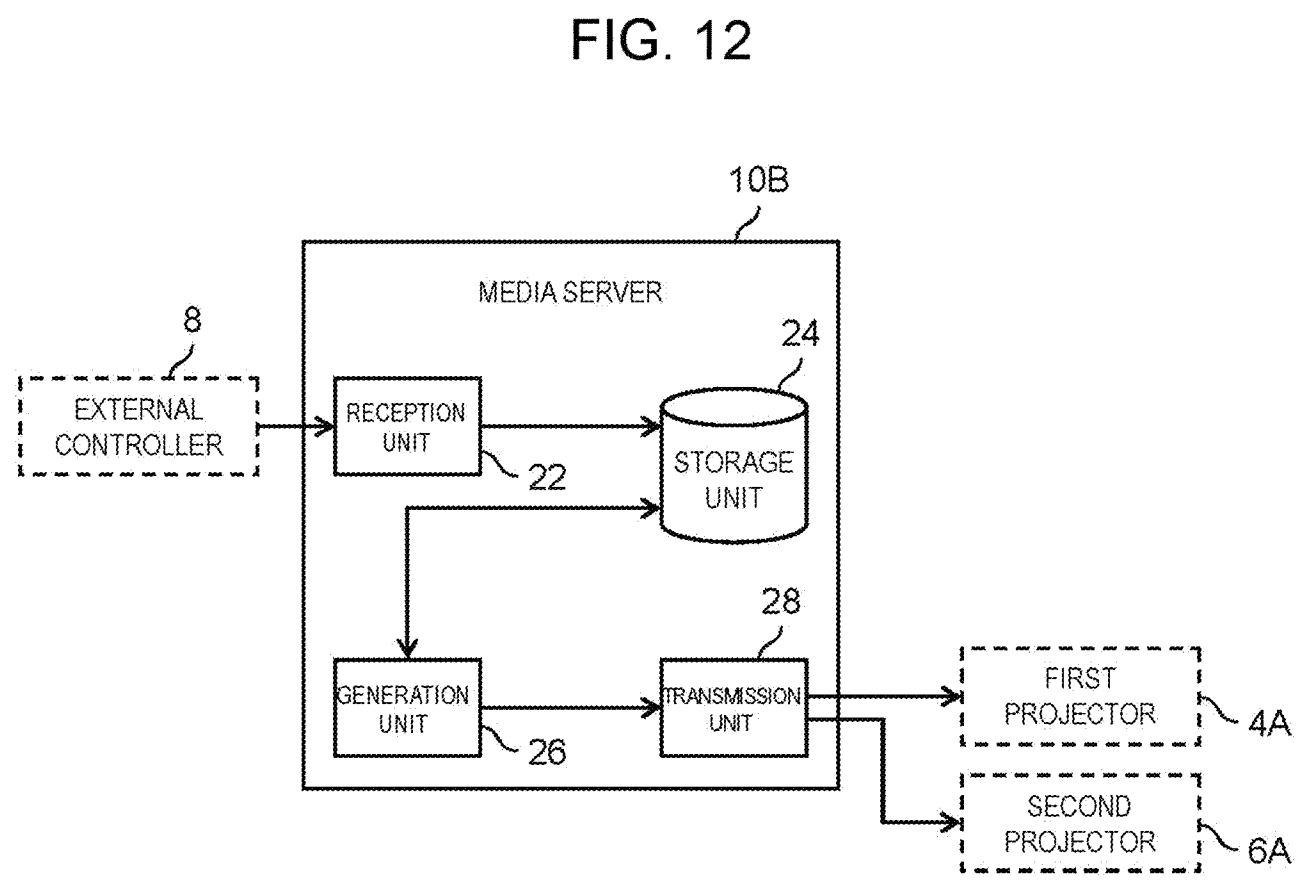

A functional configuration of media server 10B according to a second modification will now be explained with reference to FIG. 12. FIG. 12 is a block diagram illustrating a functional configuration of media server 10B according to the second modification.

As illustrated in FIG. 12, media server 10B includes reception unit 22, storage unit 24, generation unit 26, and transmission unit 28, as functional configurations, in the same manner as the exemplary embodiment described above.

Transmission unit 28 sequentially transmits the first projection image data and the first control signal for the first scene, and the first projection image data and the first control signal for the second scene, all of which are generated by generation unit 26, to first projector 4A. Specifically, the first projection image data is transmitted to an image input terminal (not illustrated) of first projector 4A. The first control signal is transmitted to a network terminal (not illustrated) of first projector 4A.

Furthermore, transmission unit 28 sequentially transmits the second projection image data and the second control signal for the first scene, and the second projection image data and the second control signal for the second scene, all of which are generated by generation unit 26, to second projector 6A. Specifically, the second projection image data is transmitted to an image input terminal (not illustrated) of second projector 6A. The second control signal is transmitted to a network terminal (not illustrated) of second projector 6A.

3-3. Operation of Projection System

Figure 13:
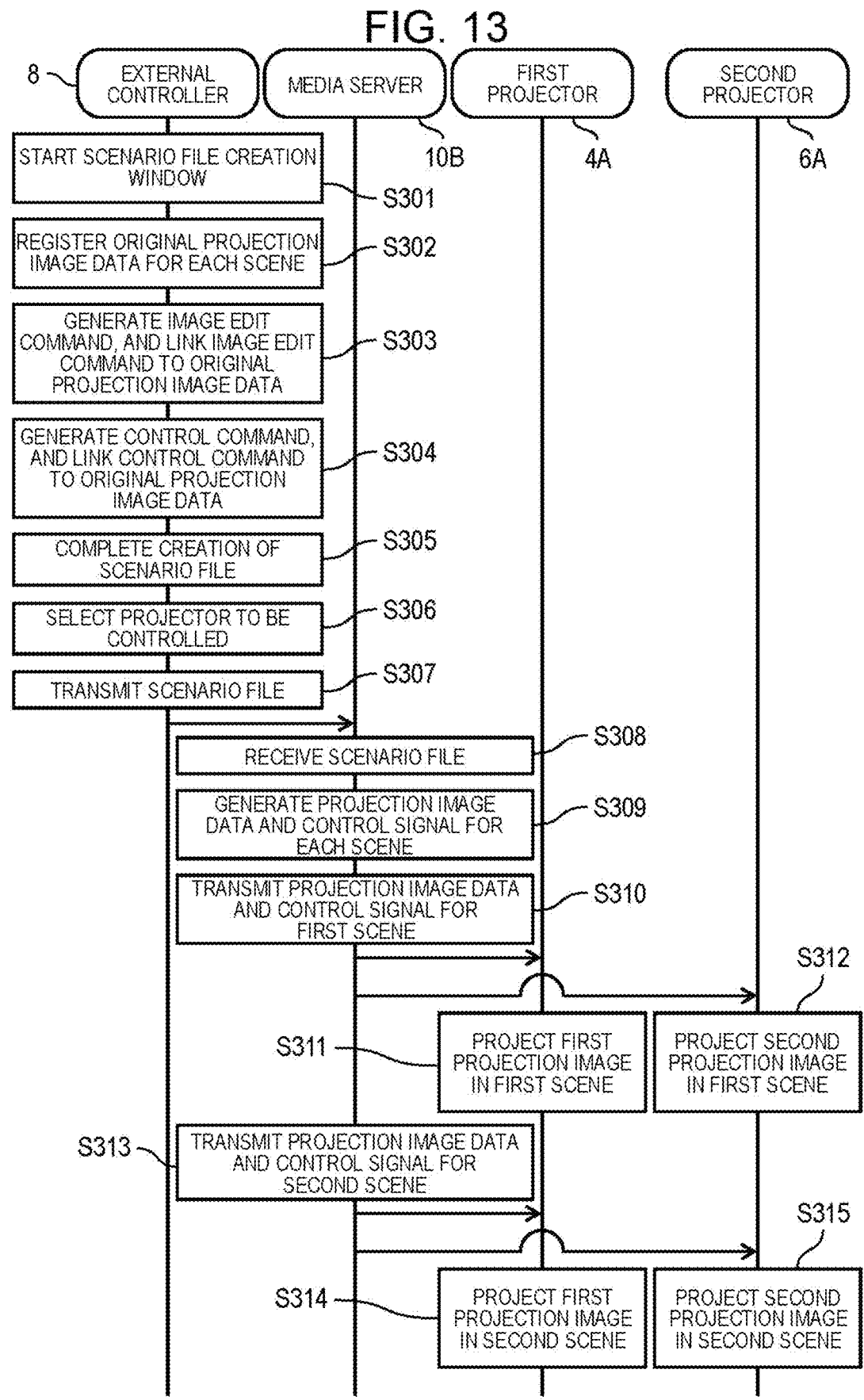
FIG. 13 is a sequence chart illustrating the sequence of an operation of the projection system according to the second modification.

An operation of projection system 2B according to the second modification will now be explained with reference to FIG. 13. FIG. 13 is a sequence chart illustrating the sequence of an operation of projection system 2B according to the second modification.

As illustrated in FIG. 13, to begin with, steps S301 to S306 are executed in the same manner as steps S101 to S106 in FIG. 7 described in the above exemplary embodiment. After step S306, external controller 8 transmits the first scenario file and the second scenario file to media server 10B (S307).

Reception unit 22 of media server 10B receives the first scenario file and the second scenario file from external controller 8 (S308).

Generation unit 26 on media server 10B generates the first projection image data and the first control signal for the first scene, and the first projection image data and the first control signal for the second scene, based on the first scenario file (S309). Furthermore, generation unit 26 generates the second projection image data and the second control signal for the first scene, and the second projection image data and the second control signal for the second scene, based on the second scenario file (S309).

Transmission unit 28 on media server 10B transmits the first projection image data and the first control signal for the first scene to first projector 4A, and transmits the second projection image data and the second control signal for the first scene to second projector 6A (S310).

Based on the first projection image data and the first control signal for the first scene, from media server 10B, first projector 4A projects first projection image 12A on the front surface of stage furnishings 32 in the first scene, as illustrated in (a) of FIG. 6 mentioned above (S311). At the same time, based on the second projection image data and the second control signal for the first scene, from media server 10B, second projector 6A projects second projection image 14A on the front surface of stage furnishings 32 in the first scene, as illustrated in (a) of FIG. 6 mentioned above (S312). As a result, on the front surface of stage furnishings 32, overall projection image 16A for the first scene is projected in the first scene.

After the first scene, transmission unit 28 on media server 10B transmits the first projection image data and the first control signal for the second scene to first projector 4A, and transmits the second projection image data and the second control signal for the second scene to second projector 6A (S313).

Based on the first projection image data and the first control signal for the second scene, from media server 10B, first projector 4A projects first projection image 12B on the front surface of backdrop 34 in the second scene, as illustrated in (b) of FIG. 6 mentioned above (S314). At the same time, based on the second projection image data and the second control signal for the second scene, from media server 10B, second projector 6A projects second projection image 14B on the front surface of backdrop 34 in the second scene, as illustrated in (b) of FIG. 6 described above (S315). As a result, during the second scene, overall projection image 16B for the second scene is projected on the front surface of backdrop 34.

Note that the timings at which the projection image data and the control signals are transmitted in step S310 described above and the timings at which the projection image data and the control signals are transmitted in step S313 described above are defined by the first scenario file and the second scenario file, respectively.

3-4. Advantageous Effects

In this modification, because one media server 10B is disposed correspondingly to first projector 4A and second projector 6A, the configuration of projection system 2B can be further simplified.
(Third Modification)

4-1. Configuration of Projection System

Figure 14:
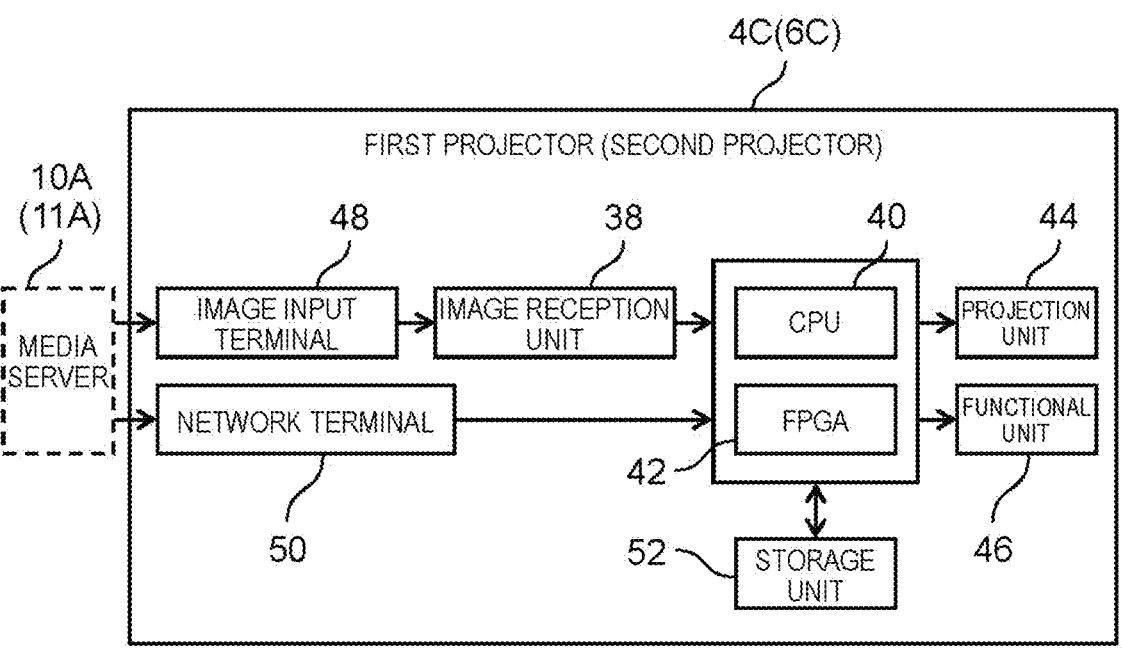
FIG. 14 is a block diagram illustrating a functional configuration of a first projector (second projector) according to a third modification.
Figure 15:
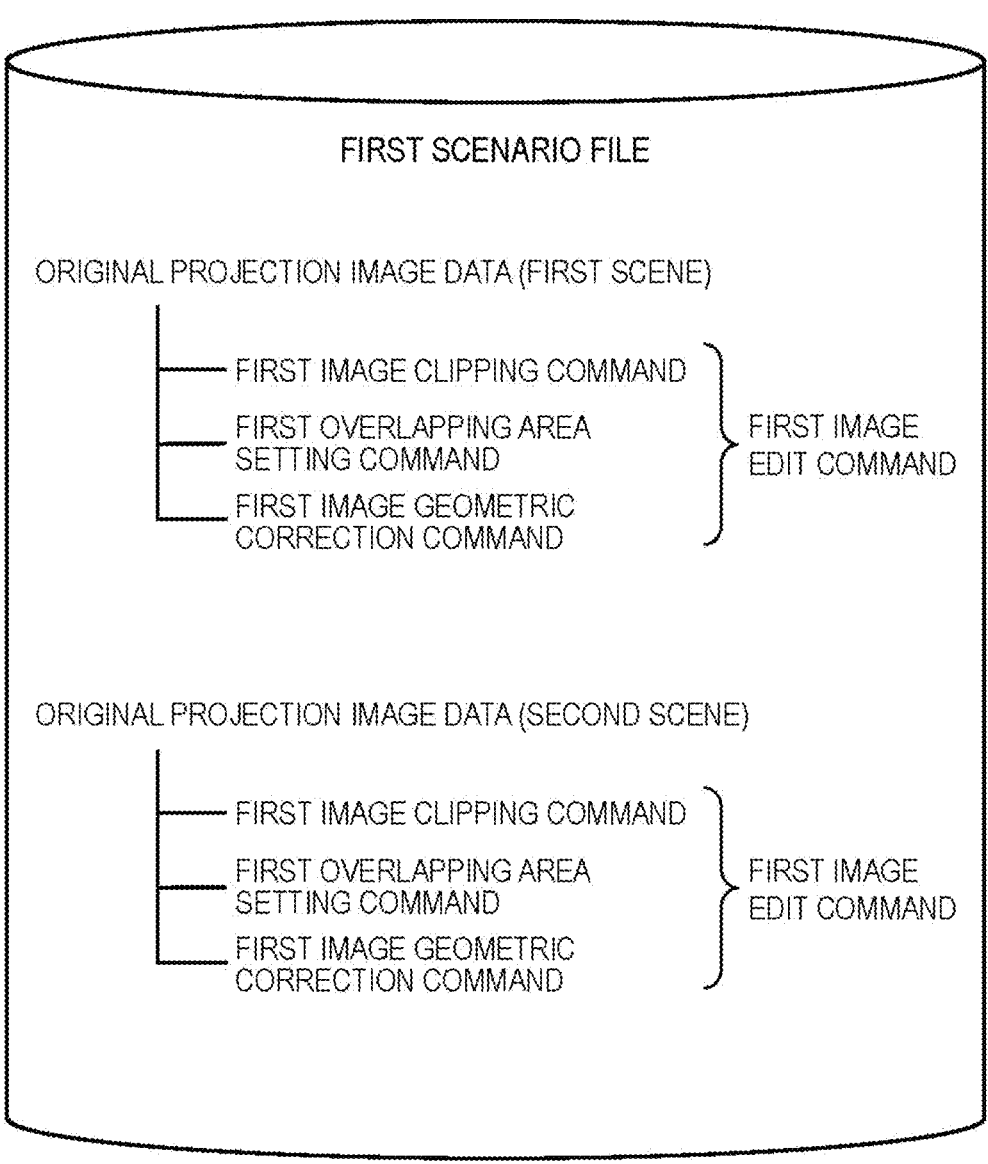
FIG. 15 is a diagram illustrating an example of a first scenario file according to the third modification.
Figure 16:
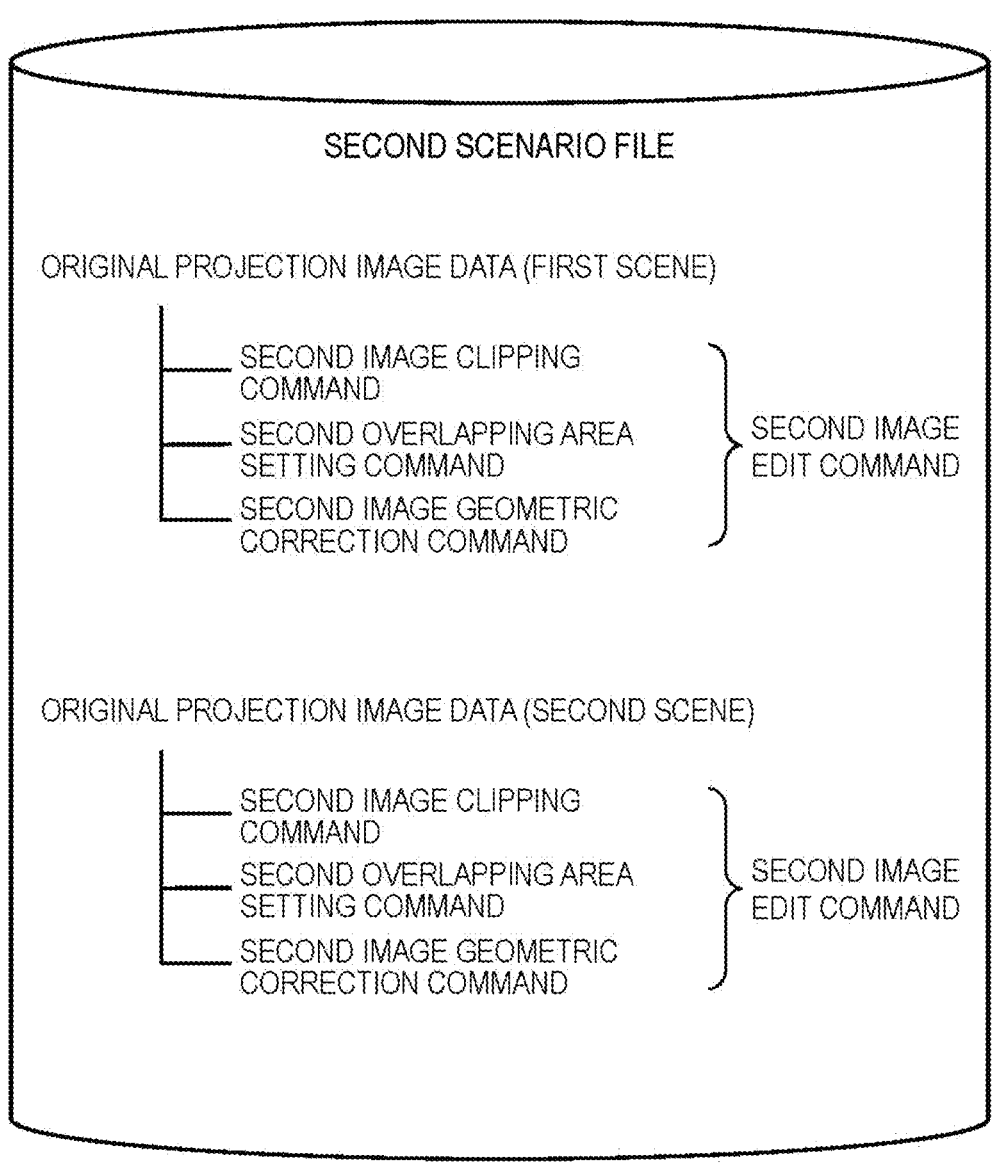
FIG. 16 is a diagram illustrating an example of a second scenario file according to the third modification.

A functional configuration of projection system 2C according to a third modification will now be explained with reference to FIGS. 14 to 16. FIG. 14 is a block diagram illustrating a functional configuration of first projector 4C (second projector 6C) of projection system 2C according to the third modification. Projection system 2C is different from projection system 2A according to the first modification in that projection system 2C includes first projector 4C and second projector 6C, and that each of first projector 4C and second projector 6C includes a storage unit that stores therein corresponding one of a first control signal and a second control signal. In this modification, components identical to those in the exemplary embodiment and the first modification described above are denoted by the same reference marks, and detailed descriptions thereof will be omitted.

As illustrated in FIG. 14, each of first projector 4C and second projector 6C of projection system 2C includes storage unit 52 that stores therein corresponding one of the first control signal and the second control signal. Storage unit 52 stores therein the first control signal (second control signal) transmitted from transmission unit 28 on first media server 10A (second media server 11A) via network terminal 50.

Furthermore, projection system 2C is different from projection system 2A according to the first modification in that neither the first scenario file nor the second scenario file includes the first control command and the second control command, and that the first control command and the second control command are transmitted to first media server 10A and second media server 11A separately from the first scenario file and the second scenario file, respectively. FIGS. 15 and 16 illustrate configurations of the first scenario file and the second scenario file received by first media server 10A and second media server 11A, respectively, from external controller 8. As illustrated in FIG. 15, the first scenario file includes original projection image data for a first scene and a second scene, a first image clipping command, a first overlapping area setting command, and a first image geometric correction command, but does not include a first control command. Furthermore, as illustrated in FIG. 16, the second scenario file includes original projection image data for the first scene and the second scene, a second image clipping command, a second overlapping area setting command, and a second image geometric correction command, but does not include a second control command.

4-2. Operation of Projection System

Figure 17:
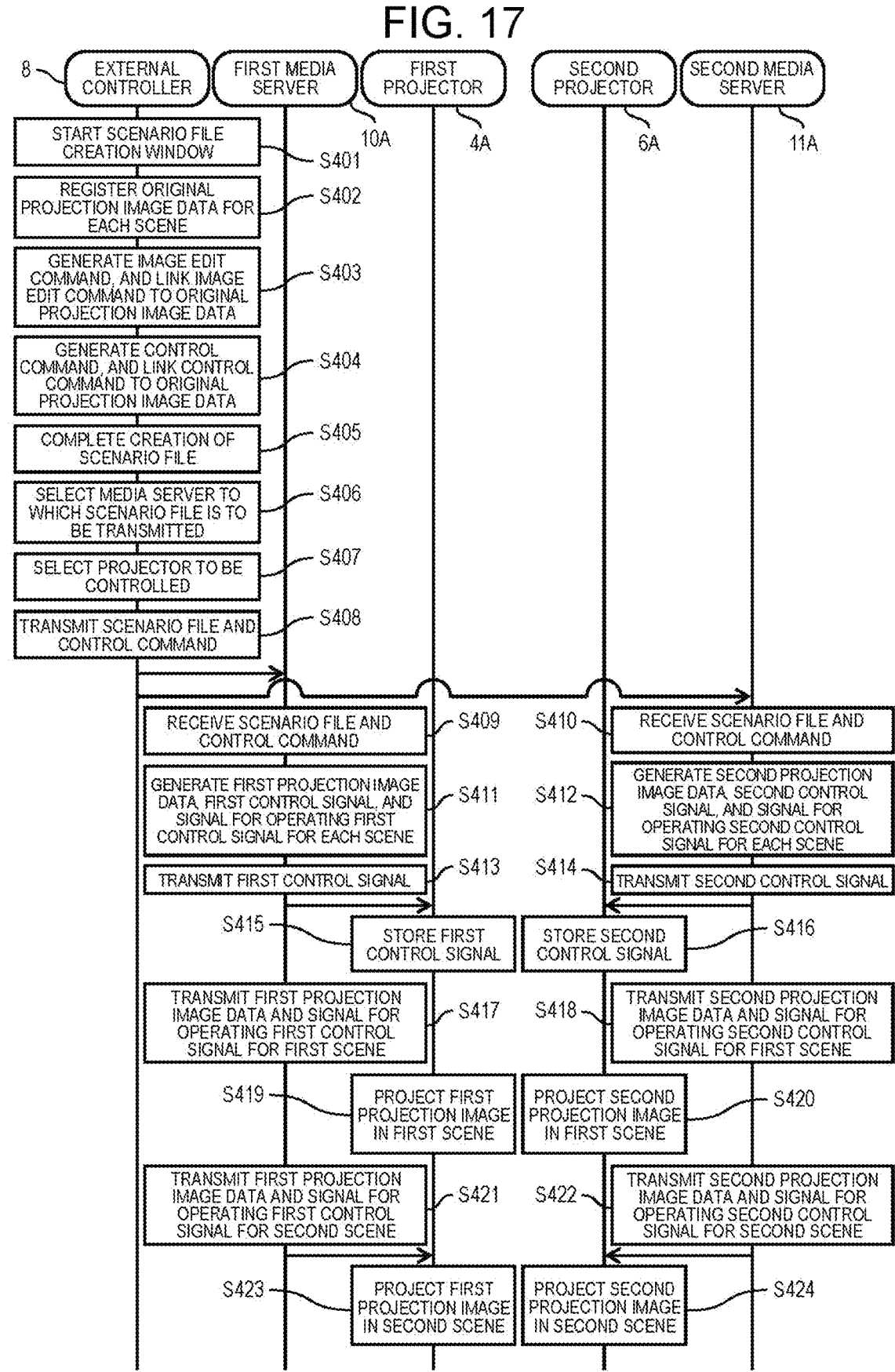
FIG. 17 is a sequence chart illustrating the sequence of an operation of the projection system according to the third modification.

An operation of projection system 2C according to the third modification will now be explained with reference to FIG. 17. FIG. 17 is a sequence chart illustrating the sequence of an operation of projection system 2C according to the third modification.

As illustrated in FIG. 17, to begin with, steps S401 to S407 are executed in the same manner as steps S201 to S207 in FIG. 10 described in the first modification. The first scenario file and the second scenario file creations of which are completed in step S405 do not include the first control command and the second control command, as described above.

After step S407, external controller 8 transmits the first scenario file and the first control command to first media server 10A, and transmits the second scenario file and the second control command to second media server 11A (S408).

Reception unit 22 on first media server 10A receives the first scenario file and the first control command from external controller 8 (S409). Reception unit 22 on second media server 11A also receives the second scenario file and the second control command from external controller 8 (S410).

Generation unit 26 on first media server 10A obtains first projection image data for the first scene and the second scene based on the first scenario file; and generates a plurality of first control signals, and signals for operating the first control signals for the first scene and the second scene, respectively, based on the first control command (S411). Furthermore, generation unit 26 on second media server 11A obtains second projection image data for the first scene and the second scene based on the second scenario file; and generates a plurality of second control signals, and signals for operating the second control signals for the first scene and the second scene, respectively, based on the second control command (S412).

Transmission unit 28 on first media server 10A transmits the first control signals for the first scene and the second scene, to first projector 4C (S413). Transmission unit 28 on second media server 11A also transmits the second control signals for the first scene and the second scene to second projector 6C (S414). First projector 4C stores therein the received first control signals for the first scene and the second scene, in storage unit 52 on first projector 4C (S415). In addition, second projector 6C stores therein the received second control signals for the first scene and the second scene, in storage unit 52 on second projector 6C (S416).

Transmission unit 28 on first media server 10A transmits the first projection image data for the first scene, and the signal for operating the first control signal, to first projector 4C (S417). Furthermore, transmission unit 28 on second media server 11A transmits the second projection image data for the first scene, and the signal for operating the second control signal, to second projector 6C (S418).

By causing the first control signal stored in storage unit 52 to operate in accordance with the signal for operating the first control signal for the first scene, received from first media server 10A, first projector 4C projects first projection image 12A onto the front surface of stage furnishings 32 in the first scene, based on the first projection image data and the first control signal for the first scene, as illustrated in (a) of FIG. 6 described above (S419). At the same time, by causing the second control signal stored in storage unit 52 to operate in accordance with the signal for operating the second control signal for the first scene, received from second media server 11A, second projector 6C projects second projection image 14A onto the front surface of stage furnishings 32 in the first scene, based on the second projection image data and the second control signal for the first scene, as illustrated in (a) of FIG. 6 described above (S420). As a result, on the front surface of stage furnishings 32, overall projection image 16A for the first scene is projected in the first scene.

After the first scene, transmission unit 28 on first media server 10A transmits the first projection image data for the second scene, and the signal for operating the first control signal, to first projector 4C (S421). Furthermore, transmission unit 28 on second media server 11A transmits the second projection image data for the second scene, and the signal for operating the second control signal, to second projector 6C (S422).

By causing the first control signal stored in storage unit 52 to operate in accordance with the signal for operating the first control signal for the second scene, received from first media server 10A, first projector 4C projects first projection image 12B onto the front surface of backdrop 34 in the second scene, based on the first projection image data and the first control signal for the second scene, as illustrated in (b) of FIG. 6 described above (S423). At the same time, by causing the second control signal stored in storage unit 52 to operate in accordance with the signal for operating the second control signal for the second scene, received from second media server 11A, second projector 6C projects second projection image 14B onto the front surface of backdrop 34 in the second scene, based on the second projection image data and the second control signal for the second scene, as illustrated in (b) of FIG. 6 described above (S424). As a result, during the second scene, overall projection image 16B for the second scene is projected on the front surface of backdrop 34.

Note that the timings at which the projection image data and the signal for operating each of the control signals are transmitted in steps S417 and S418 described above and the timings at which the projection image data and the signal for operating each of the control signals are transmitted in steps S421 and S422 described above are defined by the first scenario file and the second scenario file, respectively.

4-3. Advantageous Effects

In this modification, in the configuration in which first media server 10A and second media server 11A are configured separately from first projector 4C and second projector 6C, respectively, it is possible to reduce the load of data transmission from the first media server 10A and second media server 11A to first projector 4C and second projector 6C, respectively, by storing the first control signal and the second control signal in advance in first projector 4C and second projector 6C, respectively.

(Fourth Modification)

5-1. Configuration of Projection System

Figure 18:
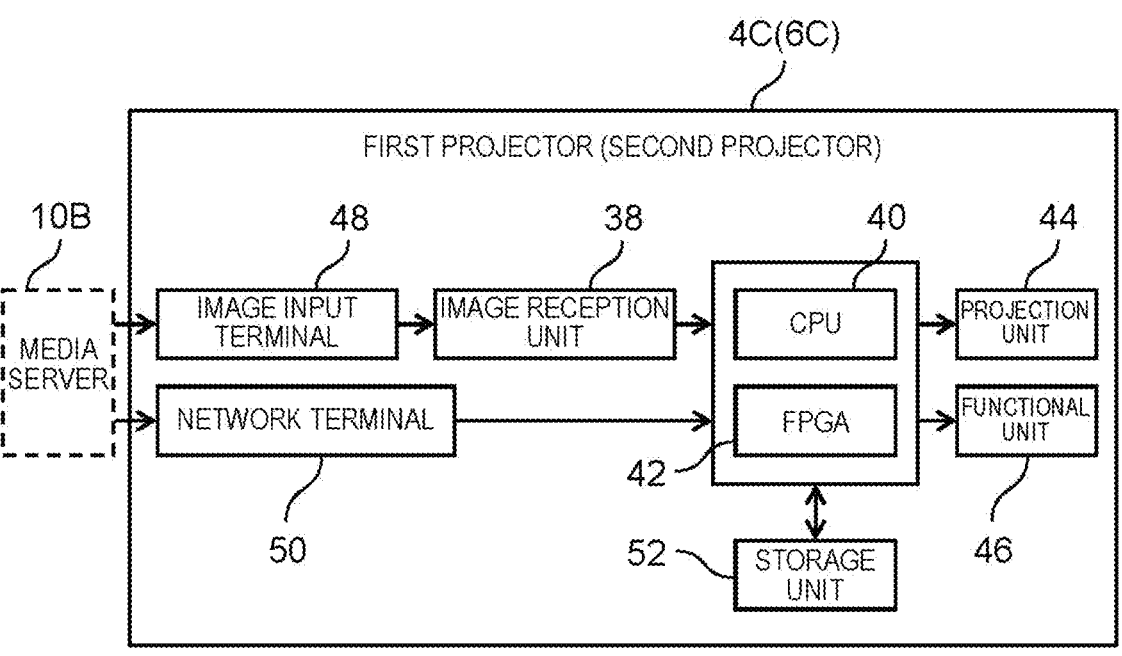
FIG. 18 is a block diagram illustrating a functional configuration of a first projector (second projector) according to a fourth modification.

A functional configuration of projection system 2D according to a fourth modification will now be explained with reference to FIG. 18. FIG. 18 is a block diagram illustrating a functional configuration of first projector 4C (second projector 6C) of projection system 2D according to the fourth modification. Projection system 2D is different from projection system 2C according to the third modification in that projection system 2D includes one media server 10B described in the second modification, as compared with first projector 4C and second projector 6C described in the third modification. In other words, in projection system 2D, one media server 10B transmits first projection image data, a first control signal, and a signal for operating the first control signal to first projector 4C, and also transmits second projection image data, a second control signal, and a signal for operating the second control signal to second projector 6C. In this modification, components identical to those in the exemplary embodiment and the second and the third modifications described above are denoted by the same reference marks, and detailed descriptions thereof will be omitted.

5-2. Operation of Projection System

Figure 19:
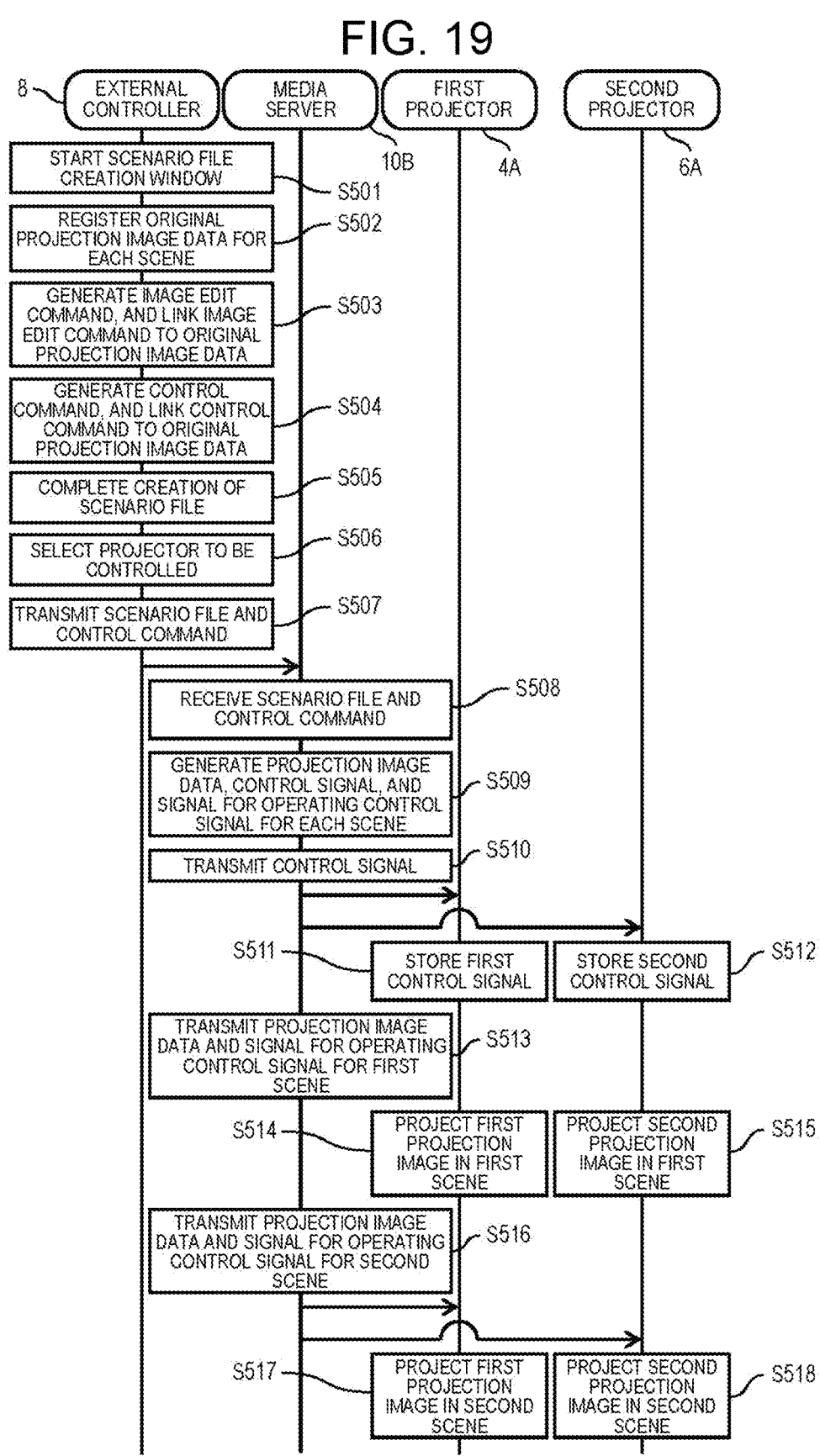
FIG. 19 is a sequence chart illustrating the sequence of an operation of the projection system according to the fourth modification.

An operation of projection system 2D according to the fourth modification will now be explained with reference to FIG. 19. FIG. 19 is a sequence chart illustrating the sequence of an operation of projection system 2D according to the fourth modification.

As illustrated in FIG. 19, to begin with, steps S501 to S506 are executed in the same manner as steps S301 to S306 in FIG. 13 described in the second modification. The first scenario file and the second scenario file creations of which are completed in step S505 do not include the first control command and the second control command, as described above.

After step S506, external controller 8 transmits the first scenario file, the second scenario file, the first control command, and the second control command to media server 10B (S507).

Reception unit 22 on media server 10B receives the first scenario file, the second scenario file, the first control command, and the second control command from external controller 8 (S508).

Generation unit 26 on media server 10B obtains first projection image data for the first scene and the second scene based on the first scenario file; obtains second projection image data for the first scene and the second scene based on the second scenario file; generates first control signals and signals for operating the first control signals for the first scene and the second scene, respectively, based on the first control command; and generates second control signals and signals for operating the second control signals for the first scene and the second scene, respectively, based on the second control command (S509).

Transmission unit 28 on media server 10B transmits the first control signals for the first scene and the second scene to first projector 4C, and transmits the second control signals for the first scene and the second scene to second projector 6C (S510). First projector 4C stores the received first control signals in storage unit 52 on first projector 4C (S511). Second projector 6C, too, stores the received second control signals in storage unit 52 on second projector 6C (S512).

Transmission unit 28 on media server 10B transmits the first projection image data for the first scene and the signal for operating the corresponding first control signal to first projector 4C; and transmits the second projection image data for the first scene and the signal for operating the corresponding second control signal to second projector 6C (S513).

By causing corresponding one of the first control signals stored in storage unit 52 to operate in accordance with the signal for operating the first control signal for the first scene, received from media server 10B, first projector 4C projects first projection image 12A onto the front surface of stage furnishings 32 in the first scene, as illustrated in (a) of FIG. 6 described above, based on the first projection image data for the first scene and the first control signal (S514). At the same time, by causing corresponding one of the second control signals stored in storage unit 52 to operate in accordance with the signal for operating the second control signal for the first scene, received from media server 10B, second projector 6C projects second projection image 14A onto the front surface of stage furnishings 32 in the first scene, as illustrated in (a) of FIG. 6 described above, based on the second projection image data for the first scene and the second control signal (S515). As a result, on the front surface of stage furnishings 32, overall projection image 16A for the first scene is projected in the first scene.

After the first scene, transmission unit 28 on media server 10B transmits the first projection image data and the signal for operating the first control signal for the second scene, to first projector 4C, and transmits the second projection image data and the signal for operating the second control signal for the second scene, to second projector 6C (S516).

By causing corresponding one of the first control signals stored in storage unit 52 to operate in accordance with the signal for operating the first control signal for the second scene, received from media server 10B, first projector 4C projects first projection image 12B onto the front surface of backdrop 34 in the second scene, as illustrated in (b) of FIG. 6 described above, based on the first projection image data and the first control signal for the second scene (S517). At the same time, by causing corresponding one of the second control signals stored in storage unit 52 to operate in accordance with the signal for operating the second control signal for the second scene, received from media server 10B, second projector 6C projects second projection image 14B onto the front surface of backdrop 34 in the second scene, as illustrated in (b) of FIG. 6 described above, based on the second projection image data and the second control signal for the second scene (S518). As a result, during the second scene, overall projection image 16B for the second scene is projected on the front surface of backdrop 34.

Note that the first scenario file and the second scenario file define the timing for transmitting the projection image data and the signals for operating the control signals in step S513, and the timing for transmitting the projection image data and the signals for operating the control signals in step S516.

5-3. Advantageous Effects

In this modification, in the configuration in which media server 10B is configured separately from first projector 4C and second projector 6C, it is possible to reduce the load of data transmission from media server 10B to first projector 4C and second projector 6C, by storing the first control signal in first projector 4C and storing the second control signal in second projector 6C in advance. Furthermore, because one media server 10B is disposed for first projector 4C and second projector 6C, the configuration of projection system 2D can be further simplified.

(Other Modifications, Etc.)

The exemplary embodiment and the modifications have been described above, as illustrative examples of the technology disclosed in the present application. The technology according to the present disclosure is, however, not limited to these exemplary embodiment and modifications thereof, and may be applied to other exemplary embodiments with modification, replacement, addition, or omission, for example, applied thereto, as appropriate. It is also possible to make new exemplary embodiments by combining the elements described in the exemplary embodiments and the modifications thereof.

Therefore, some of such other exemplary embodiments will be explained below.

In the exemplary embodiments and the like described above, projection system 2 (2A, 2B) includes two projectors (first projector 4 (4A) and second projector 6 (6A)). However, the present disclosure is not limited thereto, and projection system 2 may include three or more projectors.

In the exemplary embodiments and the like described above, the first scenario file and the second scenario file include various commands corresponding to two scenes, respectively, but the present invention is not limited thereto, and these files may include various commands corresponding to three or more scenes.

Furthermore, explained in the exemplary embodiments and the like is an example in which an object to be controlled by the scenario file is a projector, but the object to be controlled is not limited to the projector. For example, devices to be controlled other than the projector, such as an illumination device, a speaker, and a microphone (hereinafter, referred to as "other device"), may be connected to each of transmission units 28 on media server 10 and media server 11. In such a configuration, data included in the first scenario file (second scenario file) may include, in addition to the original projection image data, illumination control data for controlling the illumination device and audio data for outputting audio from the speaker. The illumination control data and the audio data are set in a manner linked to the original projection image data. In other words, the first scenario file (second scenario file) includes the illumination control data and the audio data set for each scene, in the same manner as the original projection image data. Examples of the illumination control data include a command for turning on or off the power supply of the illumination device, a voltage applied to the illumination device, and a command for instructing an illumination color. Examples of the audio data include an audio signal and a command for instructing a volume. Other examples of the other devices controlled by the first scenario file (second scenario file) may be a curtain that is a drop curtain of the stage, a firearm for the stage production, a device for generating fog or smoke, a mirror ball, and stage furnishings driven by an actuator.

In other words, the first scenario file may further include another device command for controlling a device other than the projectors including first projector 4 and second projector 6, and the other device command may be linked to the original projection image. The first scenario file may include a plurality of other device commands, and each of the plurality of other device commands may be linked to a plurality of respective types of original projection images.

Note that in each of the exemplary embodiments and the like described above, each of the elements may be implemented as a piece of dedicated hardware, or by executing a software program suitable for the corresponding element. The elements may be implemented by causing a program-execution unit, such as a CPU or a processor, to read and to execute a software program stored in a recording medium, such as a hard disk or a semiconductor memory.

It is also possible to implement some or all of the functions of projection system 2 (2A, 2B) according to each of the exemplary embodiments and the like described above, by causing a processor such as a CPU to execute a program.

As described above, the exemplary embodiments and the like have been described as illustrative examples of the technology according to the present disclosure. For this purpose, the accompanying drawings and the detailed description have been provided.

Accordingly, in order to exemplify the techniques described above, components illustrated or described in the accompanying drawings and the detailed description may include not only the components that are essential for solving the problem described above, but also components that are not essential for solving the problem. For this reason, those non-essential components should not be immediately construed as essential only based on the fact that those non-essential components are illustrated in the accompanying drawings or described in the detailed description.

Because the exemplary embodiments and the like described above are intended as illustrative examples of the technique according to the present disclosure, various modifications, replacements, additions, and omissions may be made within the scope of the appended claims or of equivalents thereof.

The projection system according to the present disclosure is applicable as a multi-projection system used on a stage of a play, for example.

What is claimed is:

1. A projection system configured to project a first projection image and a second projection image onto a projection surface, with a portion of the first projection image and a portion of the second projection image overlapping each other, the projection system comprising:

a first projector configured to project the first projection image onto the projection surface; and a second projector configured to project the second projection image onto the projection surface, wherein the first projector is configured to acquire first projection image data and a plurality of first control signals, the first projection image data representing the first projection image that is a clipping of a plurality of types of original projection images, the first control signals being linked to the first projection image data to control driving of the first projector, wherein the second projector is configured to acquire second projection image data and a plurality of second control signals, the second projection image data representing the second projection image that is a clipping of the plurality of types of original projection images, the second control signals being linked to the second projection image data to control driving of the second projector, wherein the plurality of first control signals correspond to the plurality of types of original projection images, respectively, and wherein the plurality of second control signals correspond to the plurality of types of original projection images, respectively.

2. The projection system according to claim 1, wherein:

the first projector includes a first reception unit configured to receive first command data from an external controller, the second projector includes a second reception unit configured to receive second command data from the external controller, the first command data includes:

a plurality of first image clipping commands configured to instruct the first projector to clip the first projection image from the plurality of types of original projection images to obtain the first projection image data, and a plurality of first control commands configured to instruct the first projector to generate the plurality of first control signals, the second command data includes:

a plurality of second image clipping commands configured to instruct the second projector to clip the second projection image from the plurality of types of original projection images to obtain the second projection image data, and a plurality of second control commands configured to instruct the second projector to generate the plurality of second control signals, the first projector is configured to generate the first projection image data and the plurality of first control signals based on the first command data, and the second projector is configured to generate the second projection image data and the plurality of second control signals based on the second command data.

3. The projection system according to claim 2, wherein:

the plurality of first image clipping commands correspond to the plurality of types of original projection images, respectively, the plurality of first control commands correspond to the plurality of types of original projection images, respectively, the plurality of second image clipping commands correspond to the plurality of types of original projection images, respectively, and the plurality of second control commands correspond to the plurality of types of original projection images, respectively.

4. The projection system according to claim 3, wherein the plurality of first image clipping commands and the plurality of first control commands are commands for controlling the first projector at temporally different timings.

5. The projection system according to claim 4, wherein:

the plurality of first image clipping commands are commands having identical content, and the plurality of first control commands are commands having mutually different content.

6. The projection system according to claim 3, wherein the plurality of second image clipping commands and the plurality of second control commands are commands for controlling the second projector at temporally different timings.

7. The projection system according to claim 6, wherein:

the plurality of second image clipping commands are commands having identical content, and the plurality of second control commands are commands having mutually different content.

8. The projection system according to claim 2, wherein:

each of the plurality of first image clipping commands and each of the plurality of second image clipping commands includes position coordinates in the plurality of types of original projection images, and the position coordinates of the plurality of first image clipping commands are different from the position coordinates of the plurality of second image clipping commands.

9. The projection system according to claim 3, wherein:

the first command data further includes a device command for controlling a device other than projectors including the first projector and the second projector, and the device command is linked to one of the plurality of types of original projection images.

10. The projection system according to claim 9, wherein:

the device command includes a plurality of device commands, and the plurality of device commands are linked to the plurality of types of original projection images, respectively.

11. The projection system according to claim 1, wherein:

the first projector is configured to acquire the first projection image data and the plurality of first control signals via a media server, and the second projector is configured to acquire the second projection image data and the plurality of second control signals via the media server.

12. The projection system according to claim 11, wherein:

the first projector is configured to acquire a signal for operating the plurality of first control signals via the media server, and the second projector is configured to acquire a signal for operating the plurality of second control signals via the media server.

13. A control method for a projection system configured to cause a first projector and a second projector to project a first projection image and a second projection image onto a projection surface, respectively, with a portion of the first projection image and a portion of the second projection image overlapping each other, the control method comprising:

(a) obtaining first projection image data and second projection image data, the first projection image data representing the first projection image that is a clipping from a plurality of types of original projection images, the second projection image data representing the second projection image that is a clipping from the plurality of types of original projection images;

(b) transmitting the first projection image data and a plurality of first control signals to the first projector, the plurality of first control signals being linked to the first projection image data to control driving of the first projector; and (c) transmitting the second projection image data and a plurality of second control signals to the second projector, the plurality of second control signals being linked to the second projection image data to control driving of the second projector, wherein the plurality of first control signals correspond to the plurality of types of original projection images, respectively, and wherein the plurality of second control signals correspond to the plurality of types of original projection images, respectively.

* * * * *